United States Patent [19]
Sako

[11] Patent Number: 5,978,562
[45] Date of Patent: Nov. 2, 1999

[54] INFORMING HIGHER LEVEL APPARATUS OF SUCCESSFUL DELETION OF IMAGE INFORMATION DESIGNATED FOR DELETION BY THE HIGHER LEVEL APPARATUS

[75] Inventor: Tsukasa Sako, Utsunomiya, Japan

[73] Assignee: Canon Kabushiki Kaisha, Tokyo, Japan

[21] Appl. No.: 08/805,323

[22] Filed: Feb. 24, 1997

[30] Foreign Application Priority Data

Feb. 27, 1996 [JP] Japan .................................. 8-063900

[51] Int. Cl.$^6$ ............................. G06K 15/02; H04N 1/21; G06T 1/60
[52] U.S. Cl. ............................................. 395/115
[58] Field of Search ............................ 395/115, 116; 358/401, 404, 444, 468

[56] References Cited

U.S. PATENT DOCUMENTS 5,245,368  9/1993  Farrell et al. ............................ 358/401

*Primary Examiner*—Scott Rogers
*Attorney, Agent, or Firm*—Fitzpatrick, Cella, Harper & Scinto

[57] ABSTRACT

All or necessary minimum objects are copied in an image drawing apparatus and sent to a print queue. The objects are deleted in response to a deletion command from a higher level apparatus, whereas the copied objects are deleted after a print operation. Alternatively, the objects are deleted after the print operation in response to a deletion command entered from the higher level apparatus and temporarily held. In this manner, a deletion command from the higher level apparatus is not rejected and the higher level apparatus can be released as soon as possible.

26 Claims, 22 Drawing Sheets

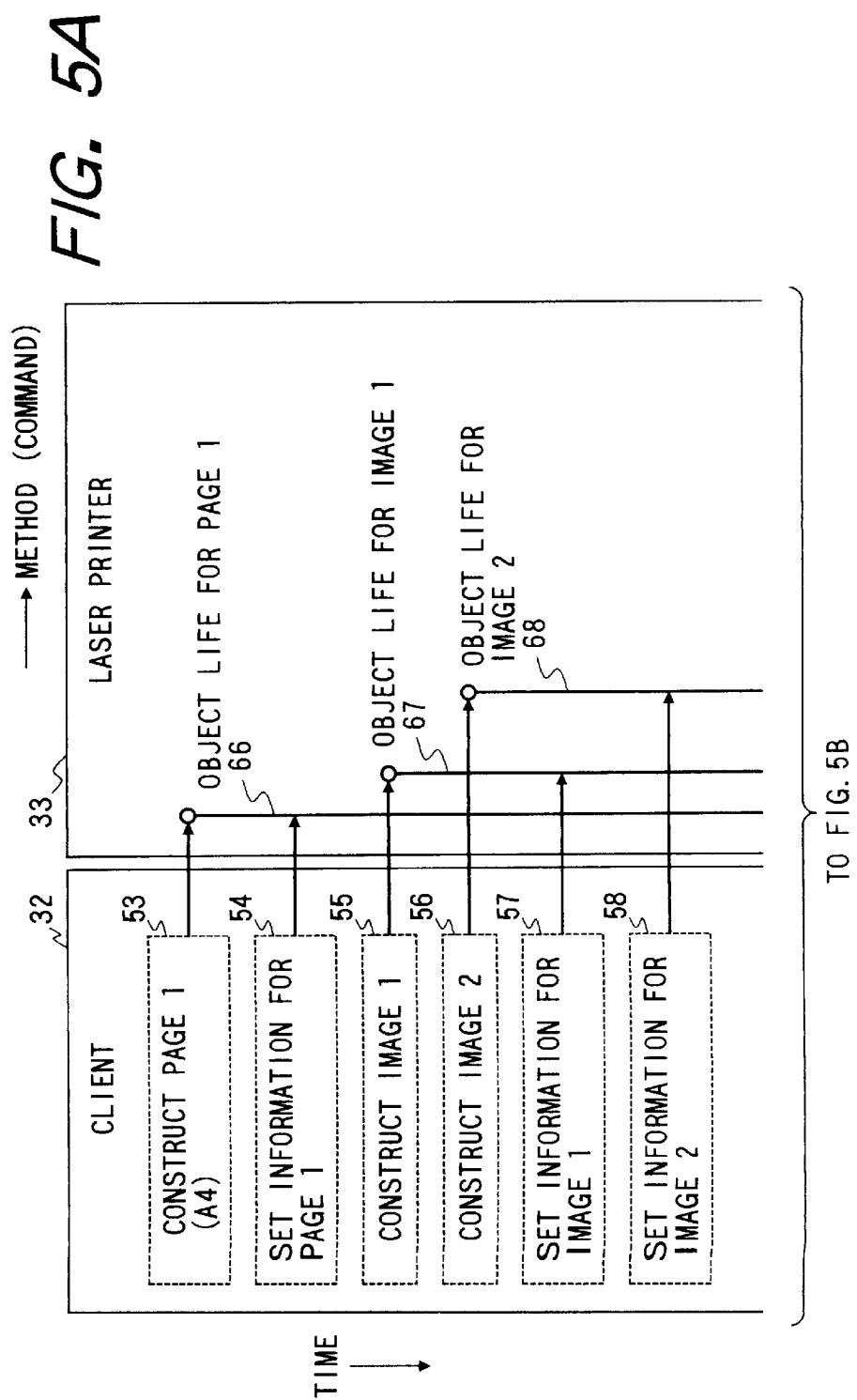

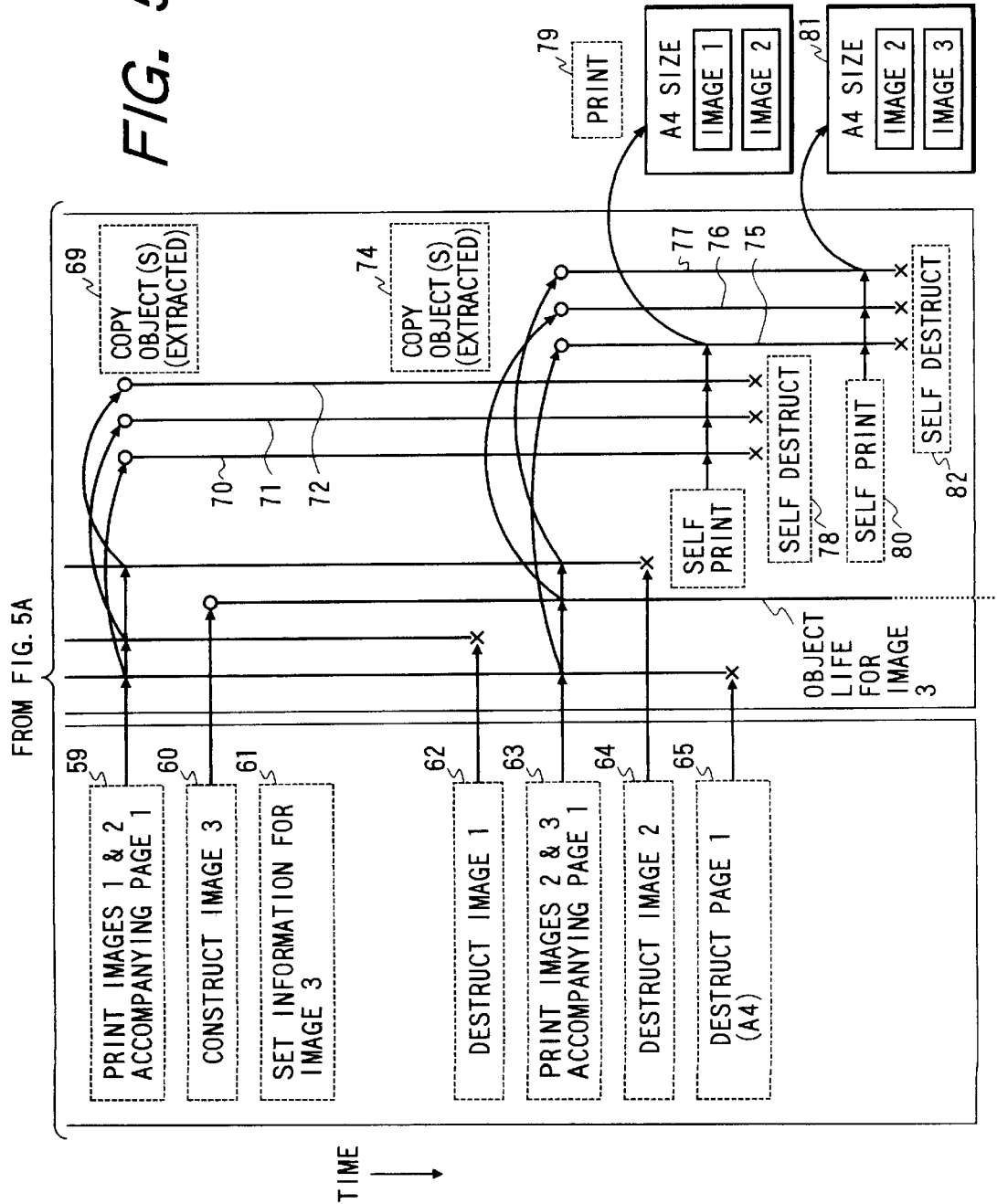

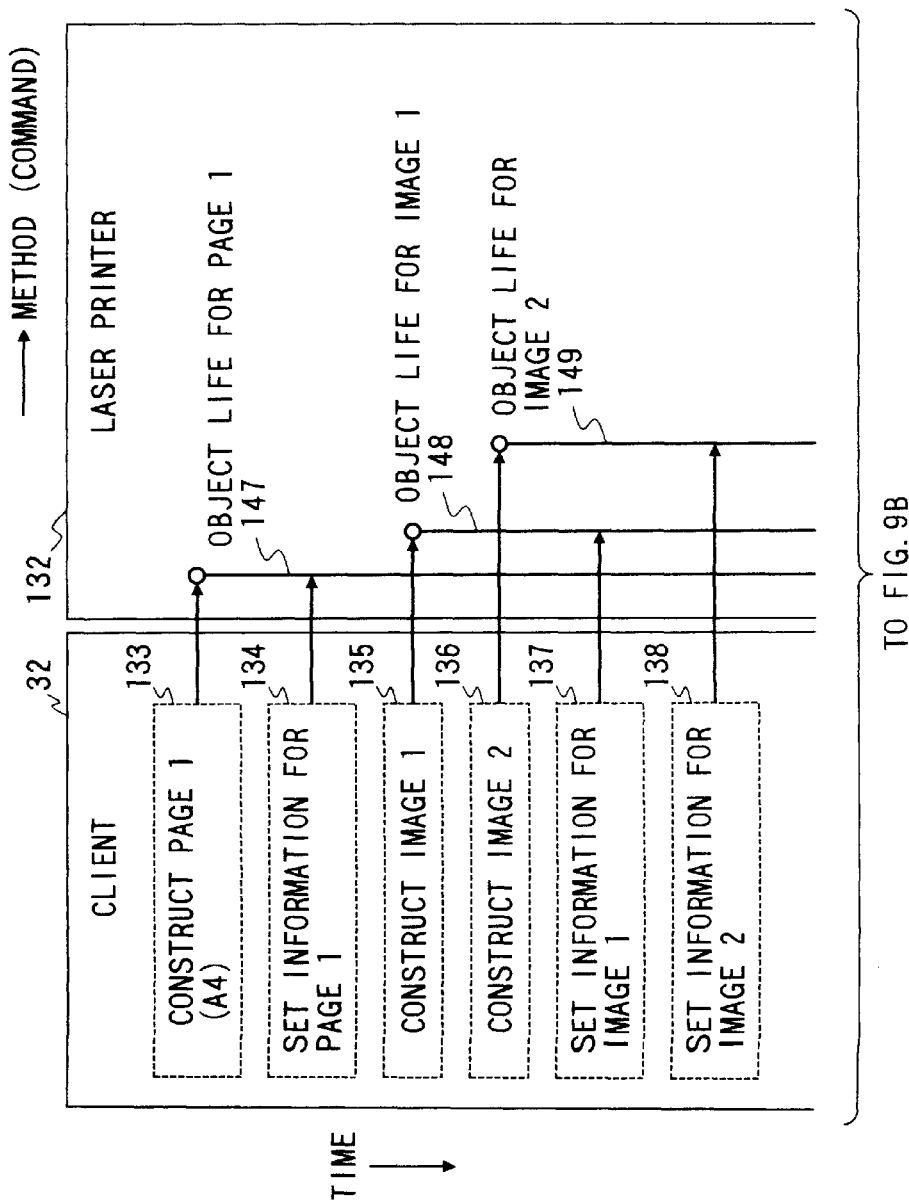

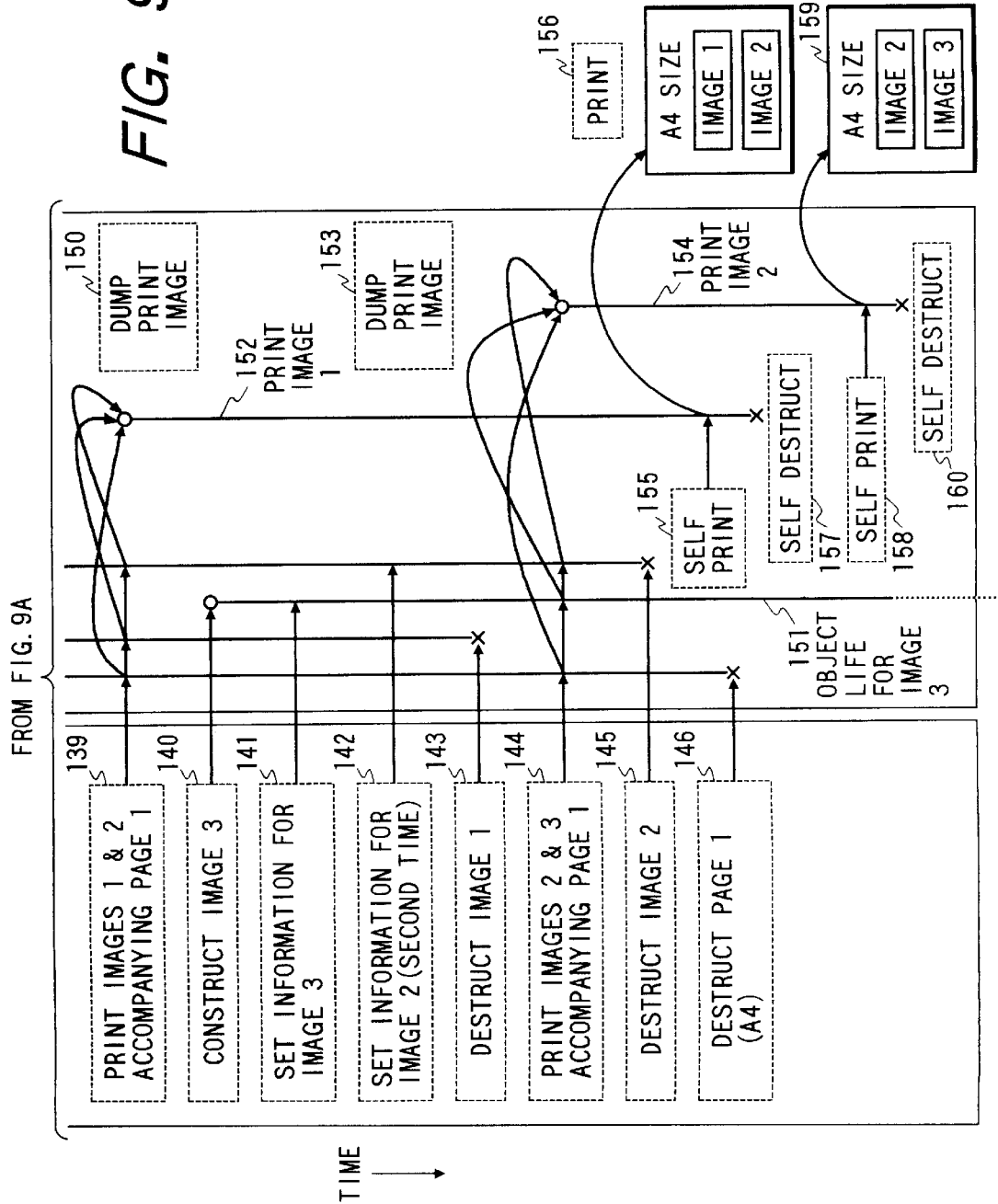

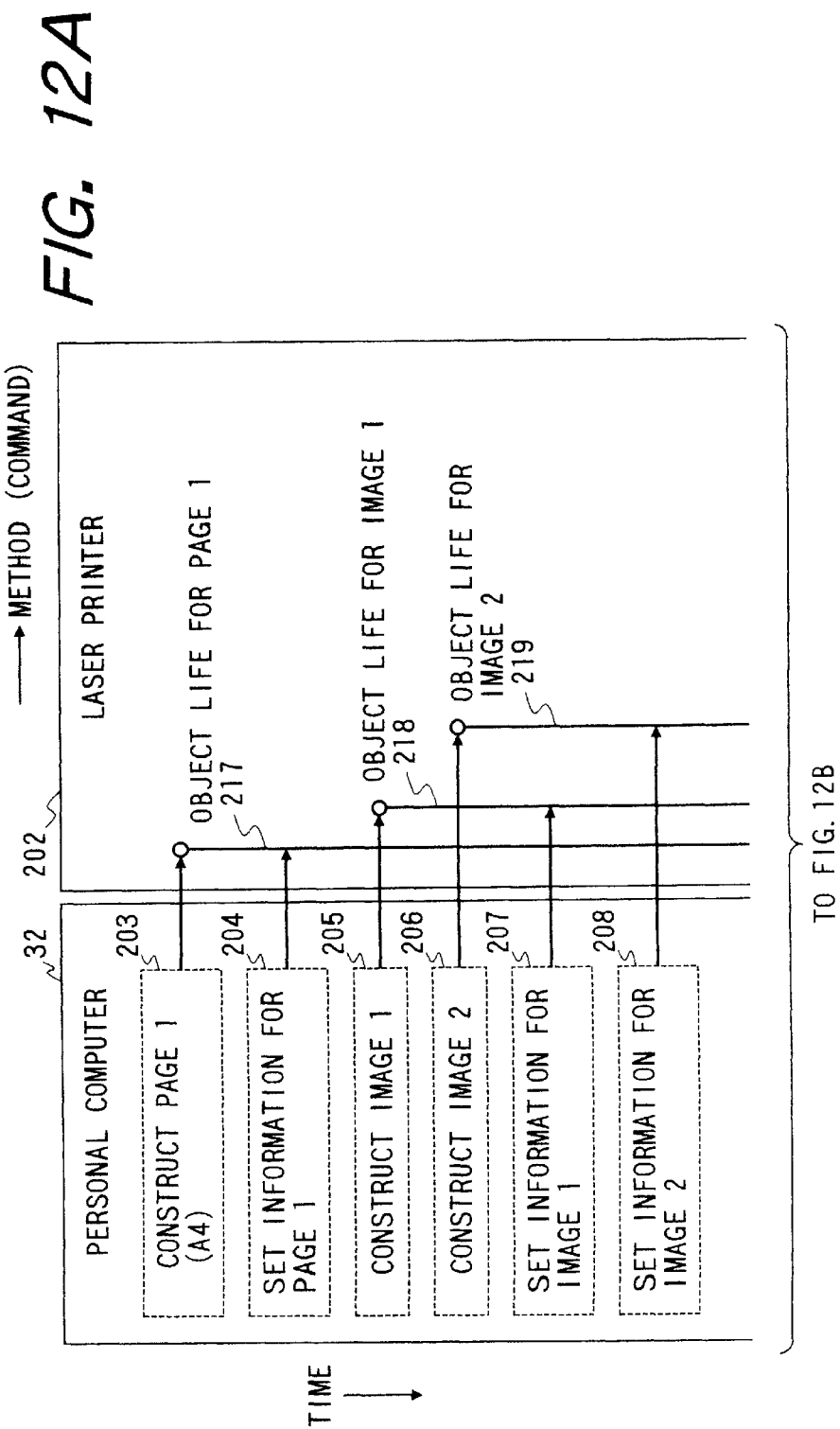

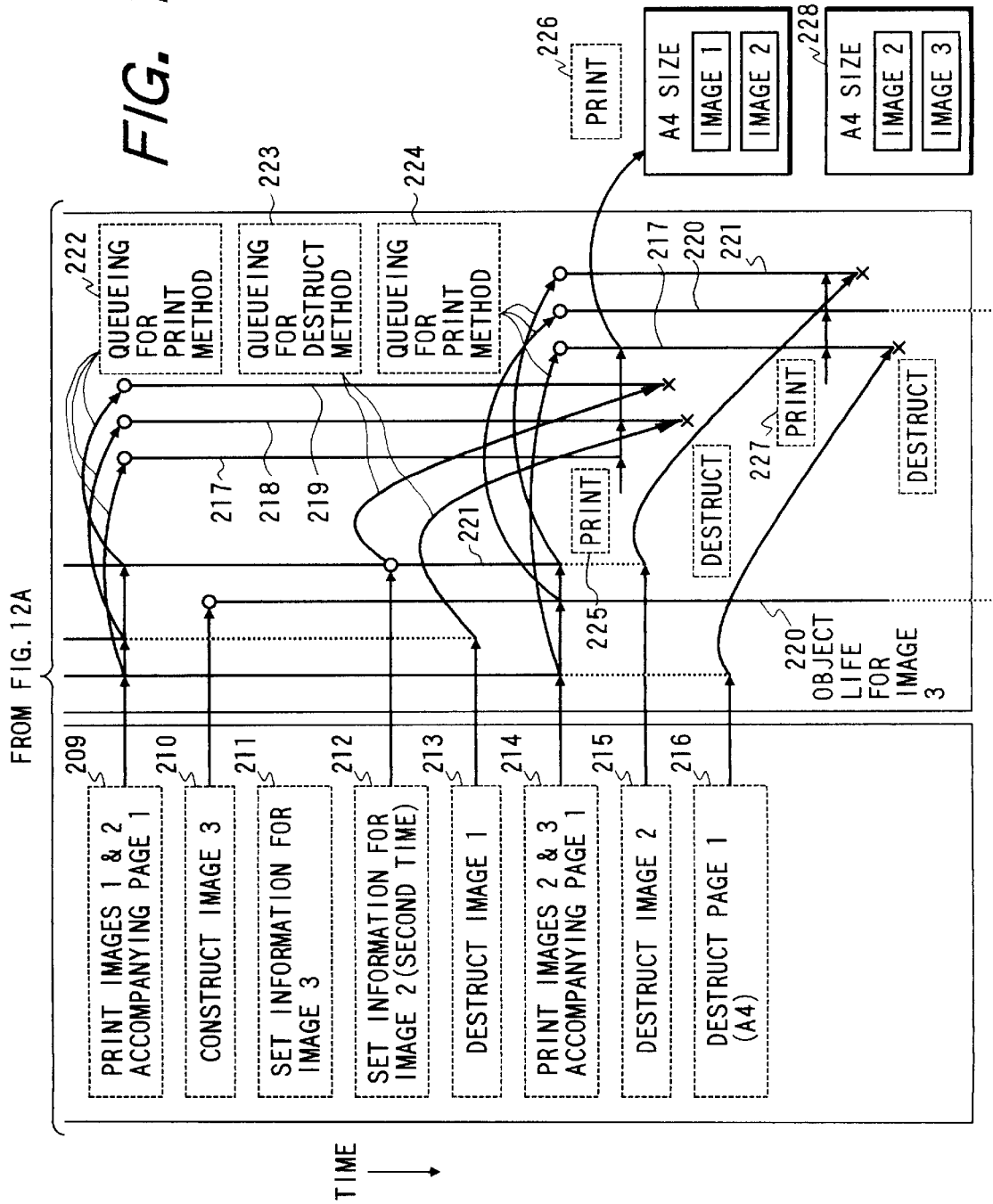

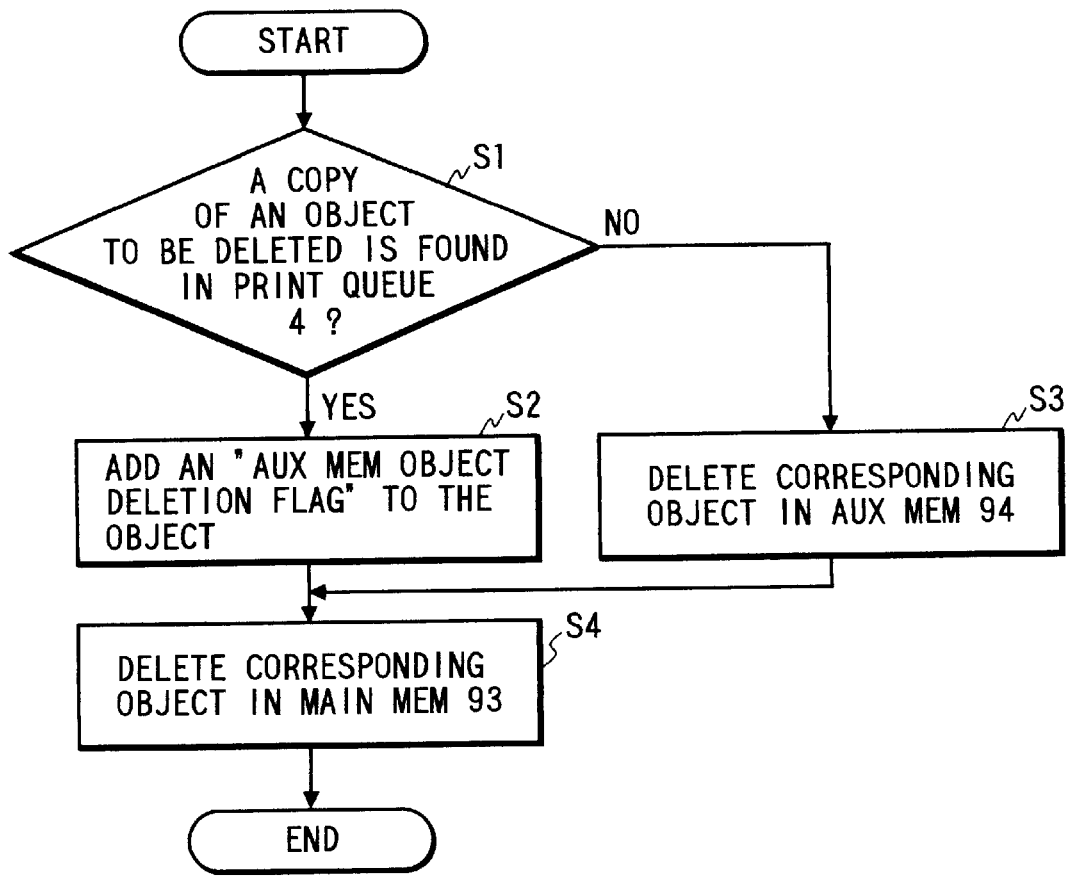
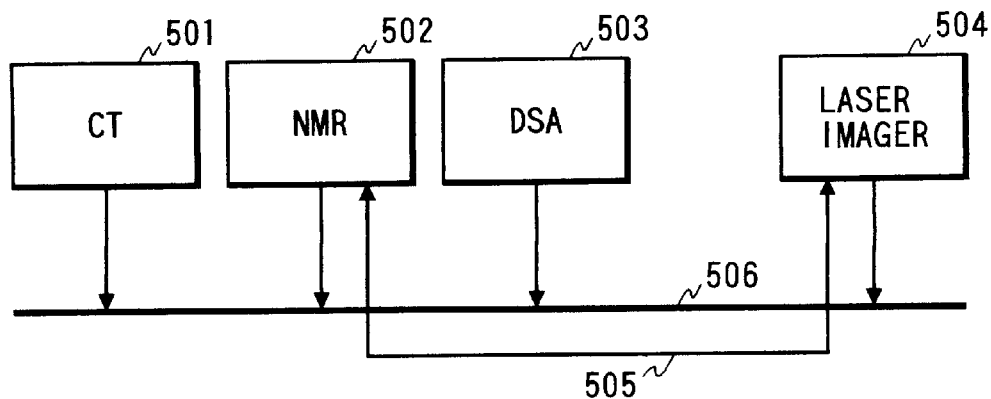

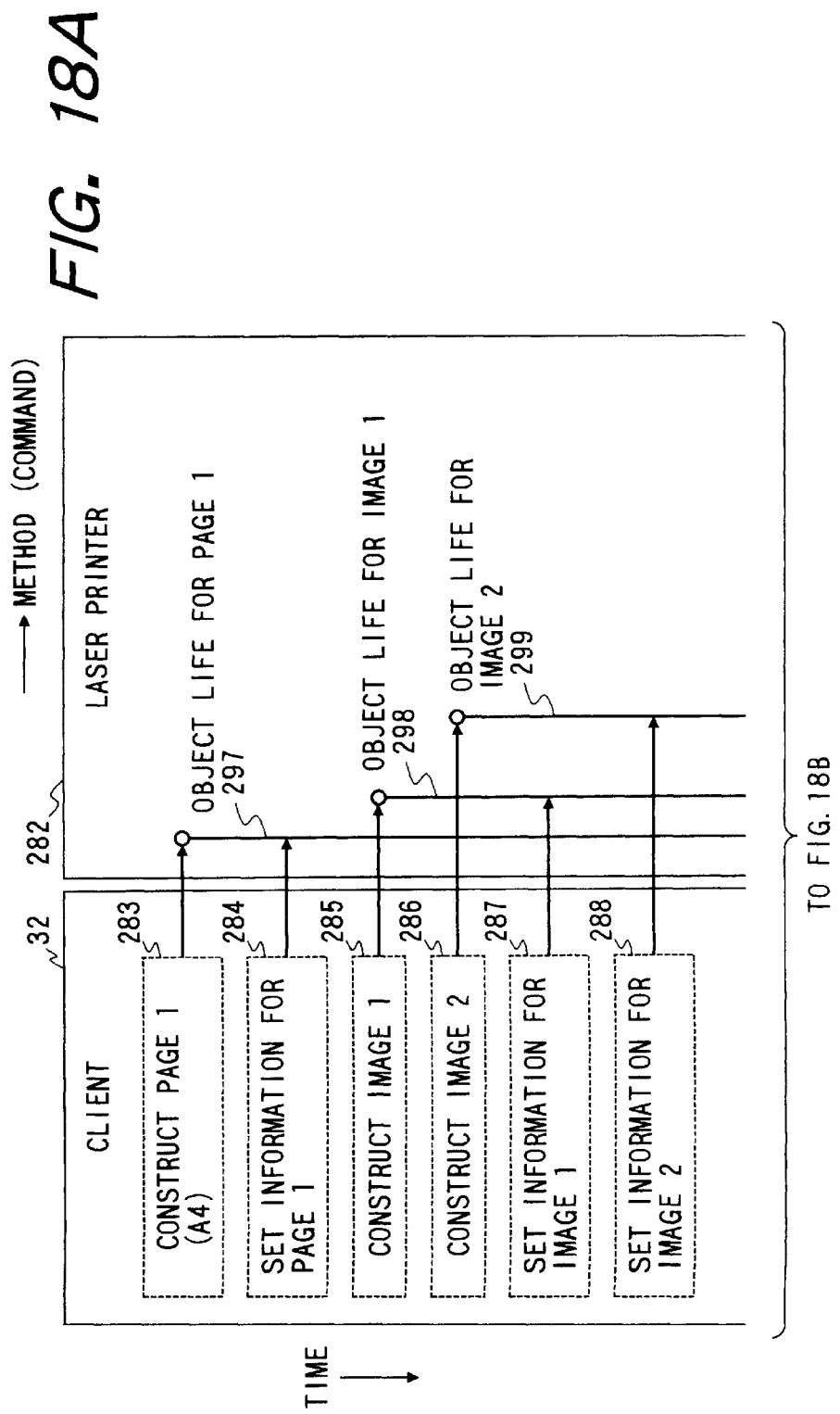

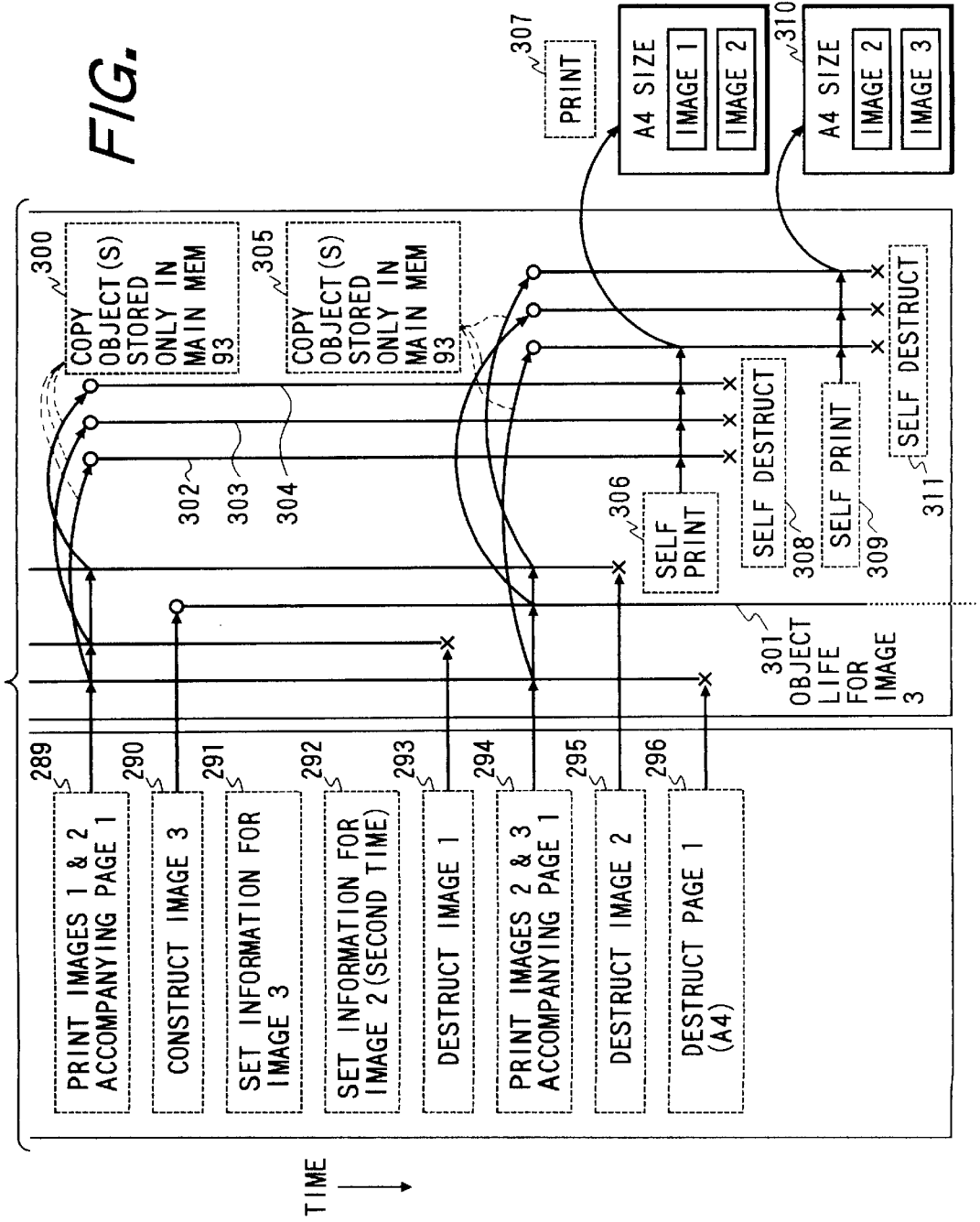

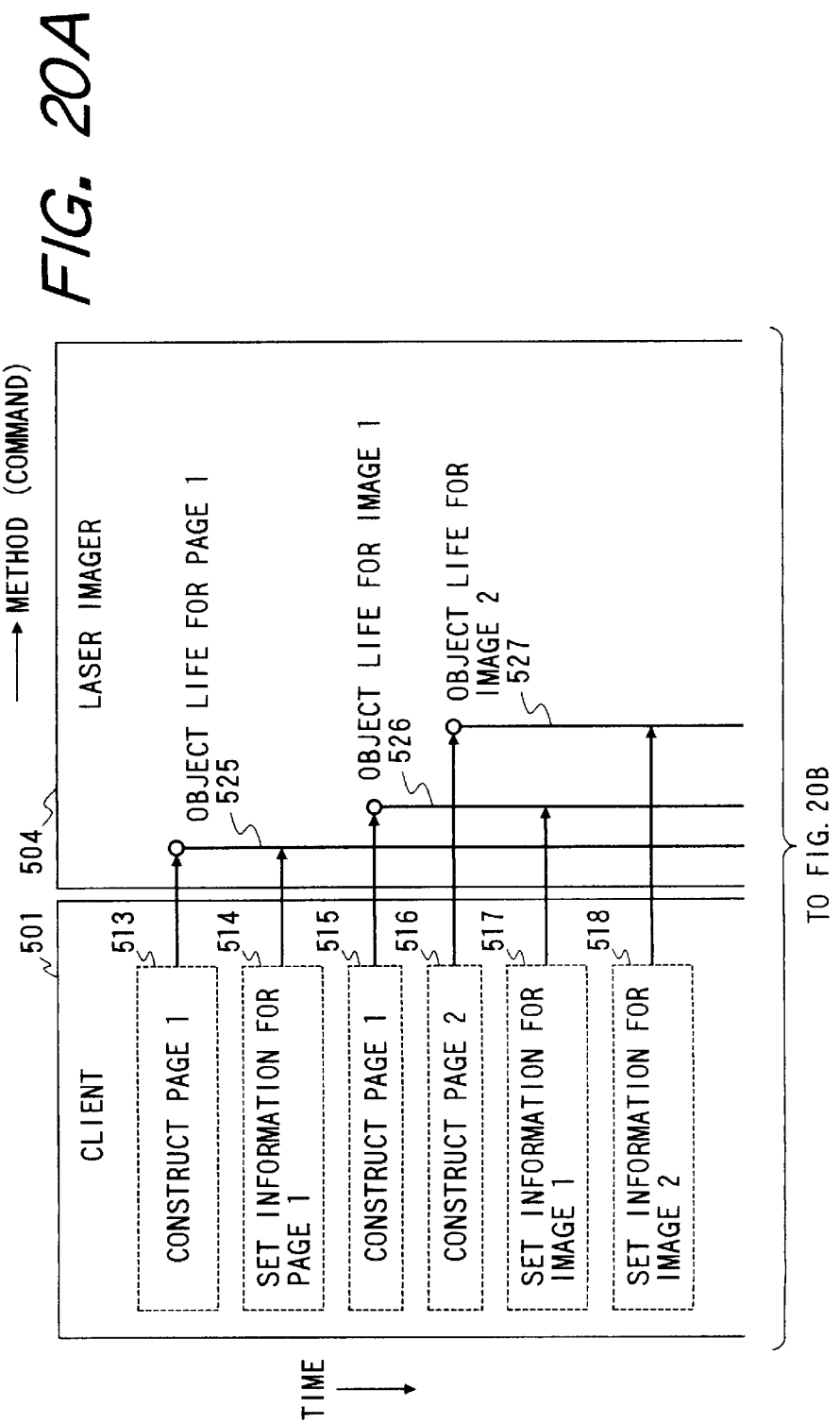

INFORMING HIGHER LEVEL APPARATUS OF SUCCESSFUL DELETION OF IMAGE INFORMATION DESIGNATED FOR DELETION BY THE HIGHER LEVEL APPARATUS

BACKGROUND OF THE INVENTION

1. Field of the Invention

The present invention relates to an image drawing apparatus and method.

2. Related Background Art

Recently, images in medical fields are often taken on X-ray films via high speed digital interface in place of video interface. Such images include CT (computer tomograph) images, NMR (nuclear magnetic resonance) images, and DSA (digital subtraction angiography) images. Image drawing apparatuses (imagers) for such purposes are typically laser imagers.

The reason why laser imagers are widely used is as follows. Conventional video interface is convenient on one hand in that CRT monitor display video signals for medical CT, NMR, DSA, and the like are directly supplied to a medical purpose laser imager. On the other hand, there is a disadvantage that noises may enter while digital data generated by medical CT, NMR, DSA, and the like is once converted into analog video signals and then again converted into digital signals by a medical purpose laser imager. Particularly for DSA, its image size is large and its video signal clock rate is as very fast as 50 MHz or so, so that it is difficult to design an interface circuit.

From the above reason, without using conventional video interface, various types of recent modalities (medical image generating apparatus) directly output digital images.

Also in the field of OA machines, imagers capable of printing digital images on printing sheets of various sizes such as A4 and B4 are used, which are generally called laser printers.

From the viewpoint of computer interconnections, digital interconnections via networks have been established. In the medical fields, a communication protocol called DICOM (Digital Imaging and Communications in Medicine) which is an object-oriented protocol, and other protocols have also been established. Images having different attributes are now printed on various types of films which users desire.

To meet such various needs, object-oriented laser imagers are now gradually prevailing because communication control is easy and integrity is good.

Conventional printing by using a conventional object-oriented laser imager will be described.

As shown in FIG. 19, in object-oriented printing, each client of modalities such as CT 501, NMR 502, and DSA 503, and work stations on a network 506 requests a laser imager 504 to construct an object of a film session which is a set of a plurality of films, objects of a plurality of films, and objects of a plurality of images.

The laser imager executes printing through assignment of an object ID, transfer of image of an object, and issuance of a print method (print command) and an object deletion method (indicated at 505).

For example, objects include an image object constituted of image data and its attributes, a film object constituted of a set of images and some film information, a session object constituted of a set of films and some session information, an LUT (look-up table) object, an overlay object, and other objects. The client requests the laser imager to construct each object and issues a method (command) for the object with a specific ID assigned thereto. In this manner, printing is executed.

After printing, unnecessary objects in the laser imager are deleted upon reception of a destruct method.

Thereafter, the laser imager notifies the client of a completion of destruction of objects. Upon reception of this notice, the client is released from the printing work.

As shown in FIGS. 20A and 20B during the operation by the laser imager 504, the client (e.g., CT 501) executes a series of sequences including requesting (513, 515, 516) the laser imager to construct one film object and two image objects for the film object, setting (514, 517, 518) information to the objects, issuing a print method 519, and thereafter issuing destruct methods 522, 523, and 524.

The print operation requires a relatively long time. Therefore, if a destruct command is issued before the print operation is not completed, the laser imager 504 rejects the destruct command (520, 521). In this case, the client 501 waits until the laser imager 504 completes the print operation, and there after issues the destruct commands 522, 523, and 524 to delete the objects (this is called hereinafter a first scheme). Alternatively, the laser imager loads a set of objects to be used for the print operation into a print queue (a first-in first-out unit for use with the print operation), and destructs the set of objects after the print operation to thereby neglect the destruct commands from the client 501 (this is called hereinafter a second scheme).

However, in the print operation at the object-oriented image drawing apparatus, typically a laser imager, the wait time of the client becomes long in the case of the first scheme, because the print operation takes a relatively long time and so the destruct command is rejected by the image drawing apparatus. The work efficiency of the client is therefore lowered greatly.

With the second scheme, if the client requests an additional print operation for the image objects, this print operation cannot be executed because the image drawing apparatus has deleted the image objects.

SUMMARY OF THE INVENTION

It is an object of the present invention to provide an image drawing apparatus and method capable of solving the above-described problems and efficiently executing printing.

In order to achieve the above object, the invention provides an image drawing apparatus comprising: first storage means for storing first image information input from a higher level apparatus; second storage means for storing second image information associated with the first image information stored in the first storage means; first deleting means for deleting the first image information stored in the first storage means in response to a deletion command entered by the higher level apparatus; and second deleting means for deleting the second image information stored in the second storage means after a print process for the second image information stored in the second storage means is completed.

The invention also provides an image drawing apparatus comprising: storage means for storing image information input from a higher level apparatus; holding means for holding a deletion command entered from the higher level apparatus; and deleting means for deleting the image information stored in the storage means in response to a deletion command held by the holding means and after a print process for the image information stored in the storage means is completed.

The invention also provides an image drawing method comprising: a step of storing first image information input from a higher level apparatus in first storage means; a step of storing second image information associated with the first image information stored in the first storage means; a first deletion step of deleting the first image information stored in the first storage means in response to a deletion command entered by the higher level apparatus; and a second deletion step of deleting the second image information stored in the second storage means after a print process for the second image information stored in the second storage means is completed.

The invention also provides an image drawing method comprising: a step of storing image information input from a higher level apparatus in storage means; a holding step of holding a deletion command entered from the higher level apparatus in holding means; and a step of deleting the image information stored in the storage means in response to a deletion command held by the holding means and after a print process for the image information stored in the storage means is completed.

BRIEF DESCRIPTION OF THE DRAWINGS

FIG. 5 is comprised of FIGS. 5A and 5B showing diagrams illustrating the operation of objects generated in response to construct methods issued from a client, according to the second embodiment.

FIG. 9 is comprised of FIGS. 9A and 9B showing diagrams illustrating the operation of objects generated in response to construct methods issued from a client, according to a fourth embodiment of the invention.

FIG. 12 is comprised of FIGS. 12A and 12B showing diagrams illustrating the operation of objects generated in response to methods issued from a client, according to a sixth embodiment of the invention.

FIG. 17 is a flow chart illustrating the operation of an object deletion process of the seventh embodiment.

FIG. 18 is comprised of FIGS. 18A and 18B showing diagrams illustrating the operation of objects generated in response to methods issued from a client, according to an eighth embodiment of the invention.

FIG. 19 is a connection diagram of a client and a laser imager according to a prior art.

DETAILED DESCRIPTION OF THE PREFERRED EMBODIMENTS

Embodiments of the invention will be described with reference to the accompanying drawings.

Figure 1:
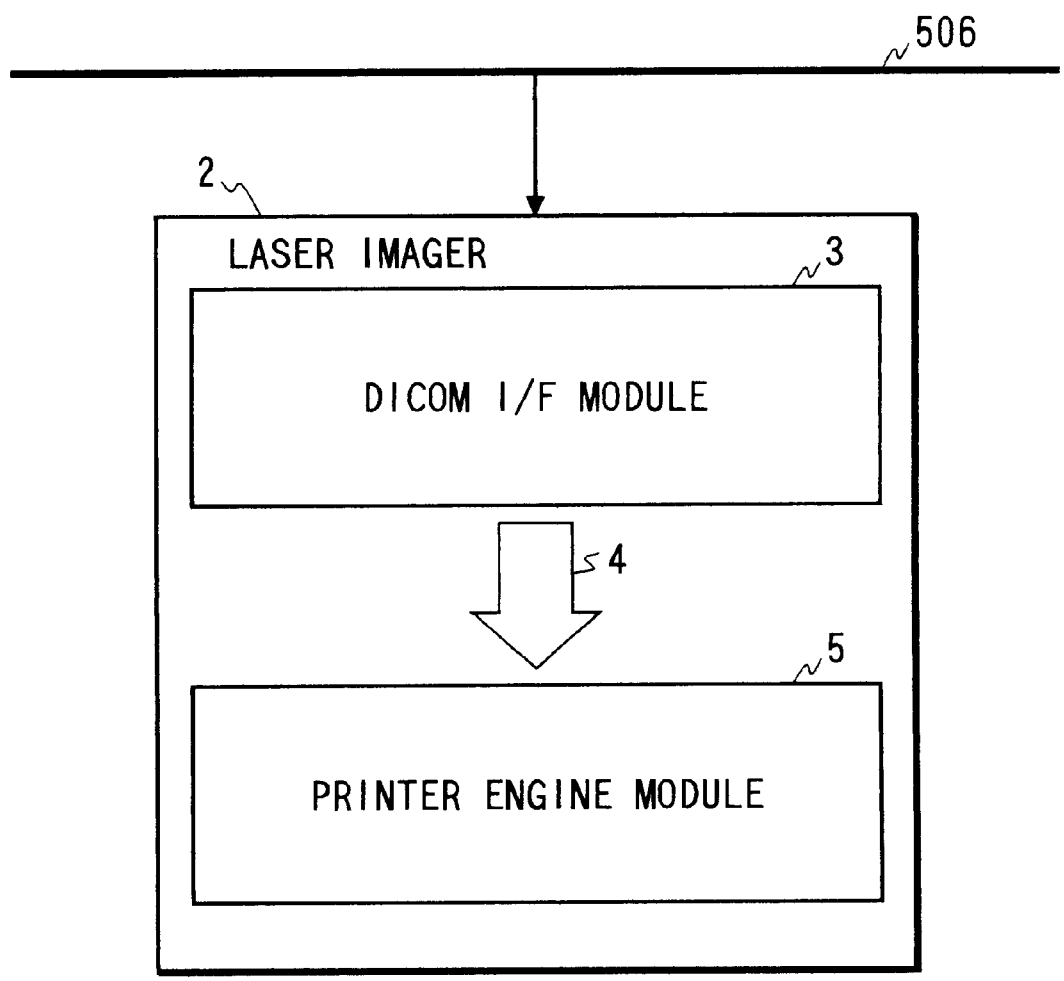
FIG. 1 is a block diagram showing the outline of the structure of an image drawing apparatus (laser imager) according to a first embodiment of the invention.

FIG. 1 is a block diagram showing the outline of the structure of an image drawing apparatus (laser imager) according to the first embodiment of the invention.

A laser imager 2 of this embodiment as an image drawing apparatus (including an output representation form setting apparatus) corresponds to the laser imager 504 of the system shown in FIG. 19. The laser imager 2 of this embodiment is interconnected to medical CT 501, NMR 502, and DSA 503 via 10M Ethernet 506 running under DICOM protocol on TCP/IP protocol.

Referring to FIG. 1, a method for an object constructed in the laser imager 2 in response to a request from each client of CT 501, NMR 502, or DSA 503 is analyzed by a DICOM interface module 3. When a page or session object receives a print method, this print command is loaded in a print queue 4 and supplied to a printer engine module 5 having a function of drawing an image. Upon reception of the command from the print queue 4, the printer engine module 5 executes printing.

Figure 2:
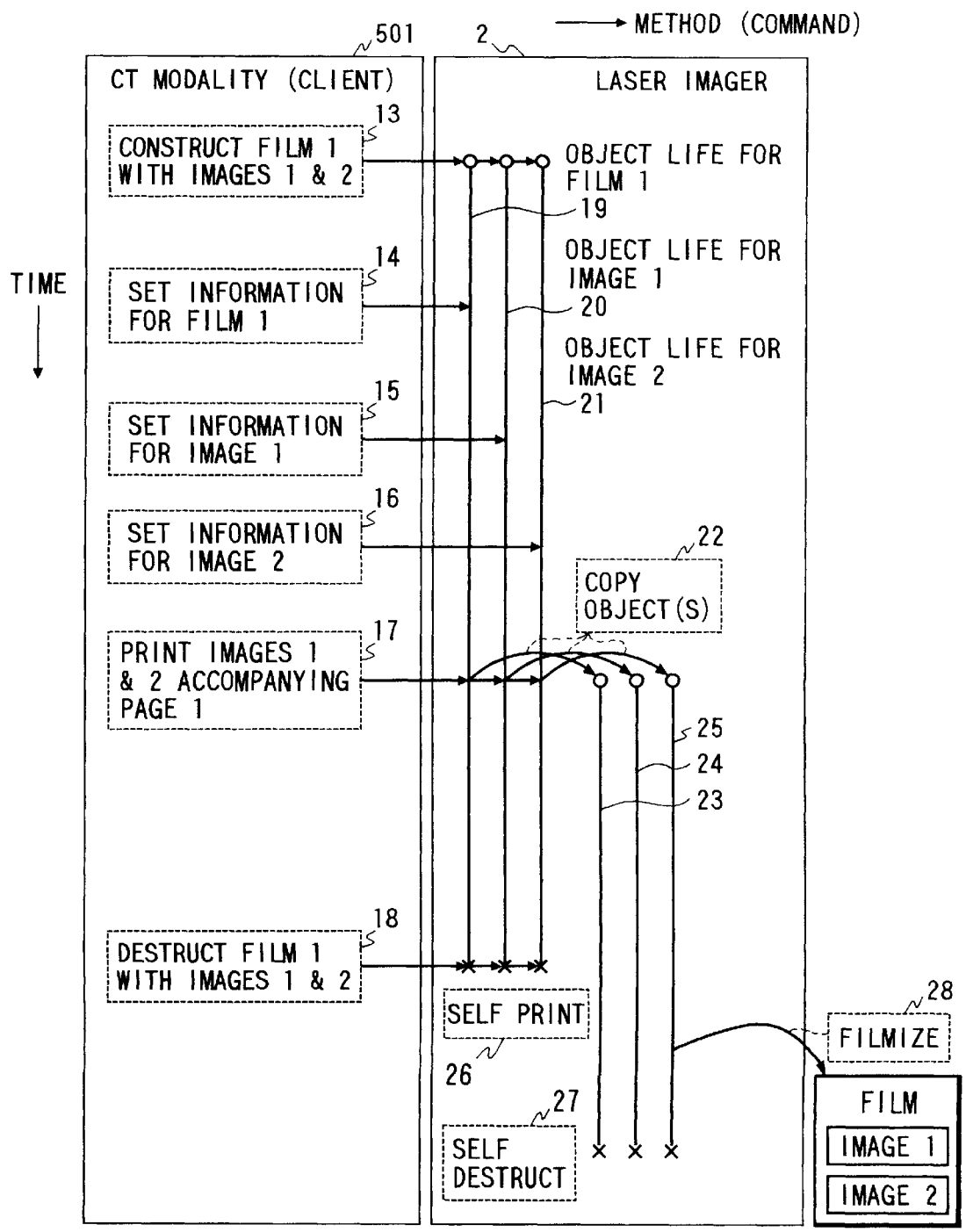
FIG. 2 is a diagram illustrating an operation of objects generated in response to methods issued from a client, according to the first embodiment.

FIG. 2 is a diagram illustrating the operations of objects generated by methods from the CT modality (client) 501, time sequentially from the upper to lower side.

With DICOM protocol, the CT modality 501 requests the laser imager 2 to construct an object 19 of a film 1 and a plurality of image objects (in this embodiment, image objects 20 and 21) to be printed on the film 1. The CT modality receives an object ID of the constructed object of the film 1 and objects IDs of the two images 1 and 2.

The CT modality 501 sets film information for the film 1 by transferring it together with the film 1 object ID to the laser imager 2 (indicated at 14). The film information includes the kind of the film, a print priority, a film density, and the like.

Next, the CT modality 501 sets image information for the image 1 by transferring it together with the image 1 object ID to the laser imager 2 (indicated at 15). The image information includes the pixel data of the image, the horizontal and vertical sizes of the image data, and the number of bytes per pixel. In this case, the film 1 object ID is also sent to set position information and the like of the image 1 on the film 1. Similarly, the image information for the image 2 together with its object ID is set (indicated at 16).

Then, the CT modality 501 issues a print method for a film with two images (indicated at 17). According to the feature of this embodiment, when the laser imager 2 receives this print method, the images 1 and 2 as well as the film 1 are completely copied in the laser imager 2 (indicated at 22). This set of copied objects is loaded in the page print queue 4 of the laser imager 2.

After issuing the print method, the CT modality 501 requests the laser imager 2 to delete the object of the film 1 by sending the object ID of the film 1 (indicated at 18). In this embodiment, upon reception of the deletion method for the film 1 object, the laser imager 2 deletes the object 19 of the film 1 as well as the objects 20 and 21 of the two images 1 and 2 of the film 1.

In this deletion process, the objects 23, 24, and 25 copied in response to the print method (indicated at 22) and queued in the page print queue 4 are not deleted. According to the feature of this embodiment, therefore, an actual print work can be delayed without being affected by a film/image deletion method from the CT modality 501.

The printer engine module 5 fetches the set of queued objects and executes printing them on a film by using hardware (indicated at 26). In this case, the laser imager 2 itself issues a print method to its own objects, i.e., performs a self print (indicated at 26). Since the CT modality 501 considers that the laser imager 2 has already printed, it sequentially issues the deletion methods for the objects of the film 1 and images 1 and 2.

After the print is correctly filmized (indicated at 28), the printer engine module 5 executes a self destruction for deleting objects used for printing (indication at 27) to release a storage area reserved in the laser imager 2.

Next, the second embodiment of the invention will be described.

Figure 3:
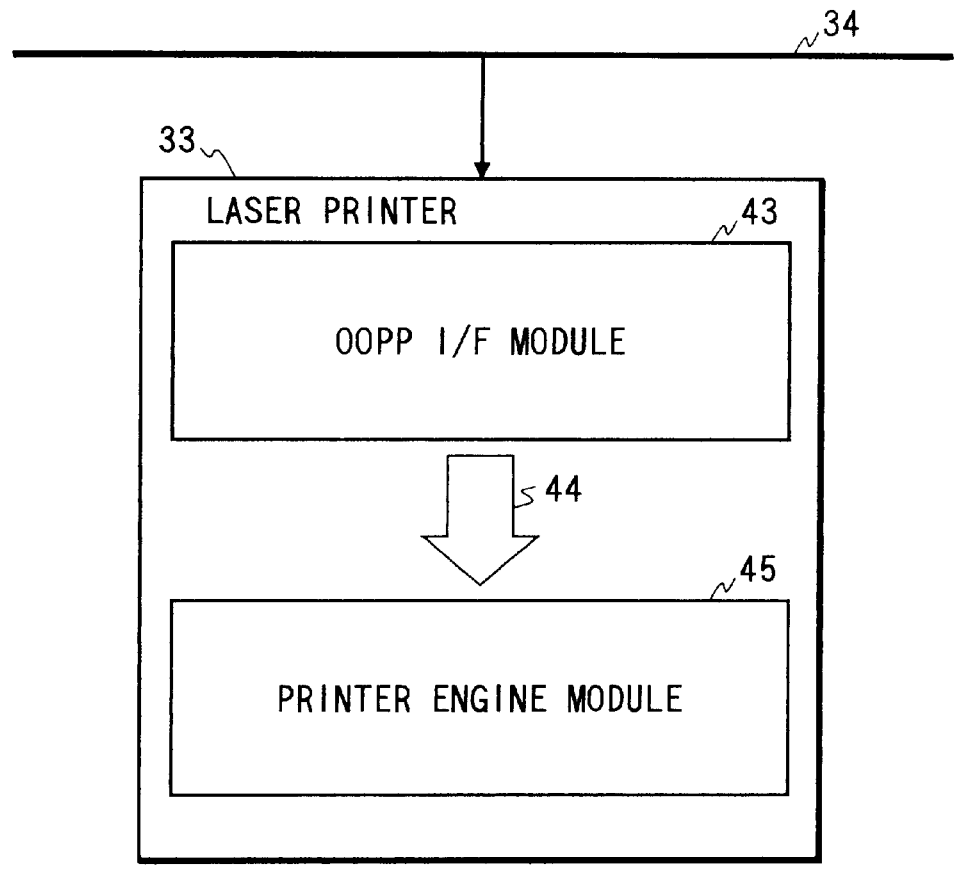
FIG. 3 is a block diagram showing the outline of the structure of an image drawing apparatus (laser printer) according to a second embodiment of the invention.

FIG. 3 is a block diagram showing the outline of the structure of an image drawing apparatus (laser printer) according to the second embodiment of the invention.

Figure 4:
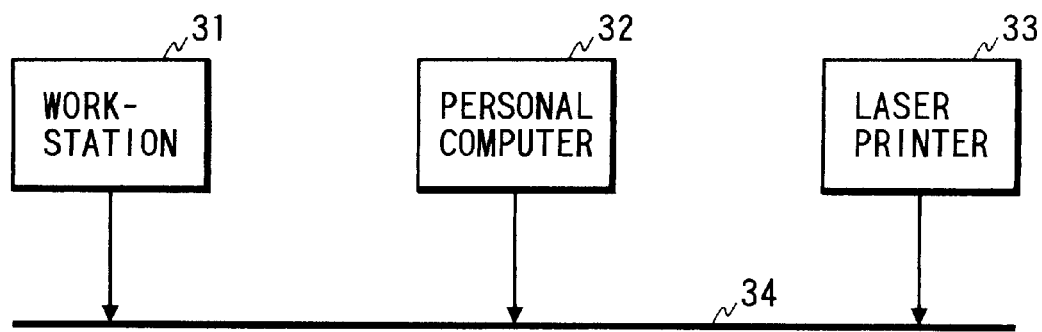
FIG. 4 is a diagram showing interconnection between a client and the laser printer of the second embodiment.

An image drawing apparatus (an output representation form setting apparatus) of this embodiment is realized by a laser printer 33 shown in FIG. 4. As shown in FIG. 4, the laser printer 33 is interconnected to OA apparatuses such as a work station 31 and a personal computer 32 via 100M high speed Ethernet 34 running under object-oriented print protocol (OOPP).

The operation of this system is almost the same as the first embodiment. Each method for objects constructed in the laser printer 33 in response to requests from the client including the work station 31 and personal computer 32 is analyzed by an interface module 43. When a print method for the page object is received, the print objects are loaded in a print queue 44 and supplied to a printer engine module 45 which receives the objects from the queue 44 and executes a print operation.

FIGS. 5A and 5B are diagrams illustrating the operations of objects generated by construct methods 53, 55, 56, and 60 from the personal computer (client) 32, time sequentially from the upper to lower side.

The generation and deletion processes for an object are different from the first embodiment. In this embodiment, a page object and an image object are constructed asynchronously. Deletion by a destruct method is also executed asynchronously (62, 64, 65).

The operation method similar to the first embodiment can be used also in this embodiment. Specifically, when a print method 59 for the images 1 and 2 of the page 1 is received, the objects for this print method are copied in the laser printer (69). In this case, it is not necessary to copy all of the page and image information transferred from the personal computer 32, but it is sufficient if only the information necessary for the print operation is copied.

In this embodiment, therefore, not all the objects are copied but only the information necessary for the print operation is copied. In other words, a simple copy is performed. An unnecessary storage area of the apparatus is not used therefore, and a more efficient print operation is possible.

In the first and second embodiments, all or only necessary minimum objects are copied in the image drawing apparatus, and the copied objects are supplied to the print queue. Therefore, the print operation can be executed efficiently.

Next, the third embodiment of the invention will be described.

An image drawing apparatus (an output representation form setting apparatus) of this embodiment is realized by a laser imager 102 corresponding to the laser imager 504 of the system shown in FIG. 19. The laser imager 102 of this embodiment is interconnected to medical CT 501, NMR 502, and DSA 503 via 10M Ethernet 506 running under DICOM protocol on TCP/IP protocol.

The laser imager 102 of this embodiment has the same structures as, and similar functions to, those of the laser imager 2 of the first embodiment shown in FIG. 1. In the following description, identical reference numerals to those shown in FIG. 1 are used for simplicity.

Figure 6:
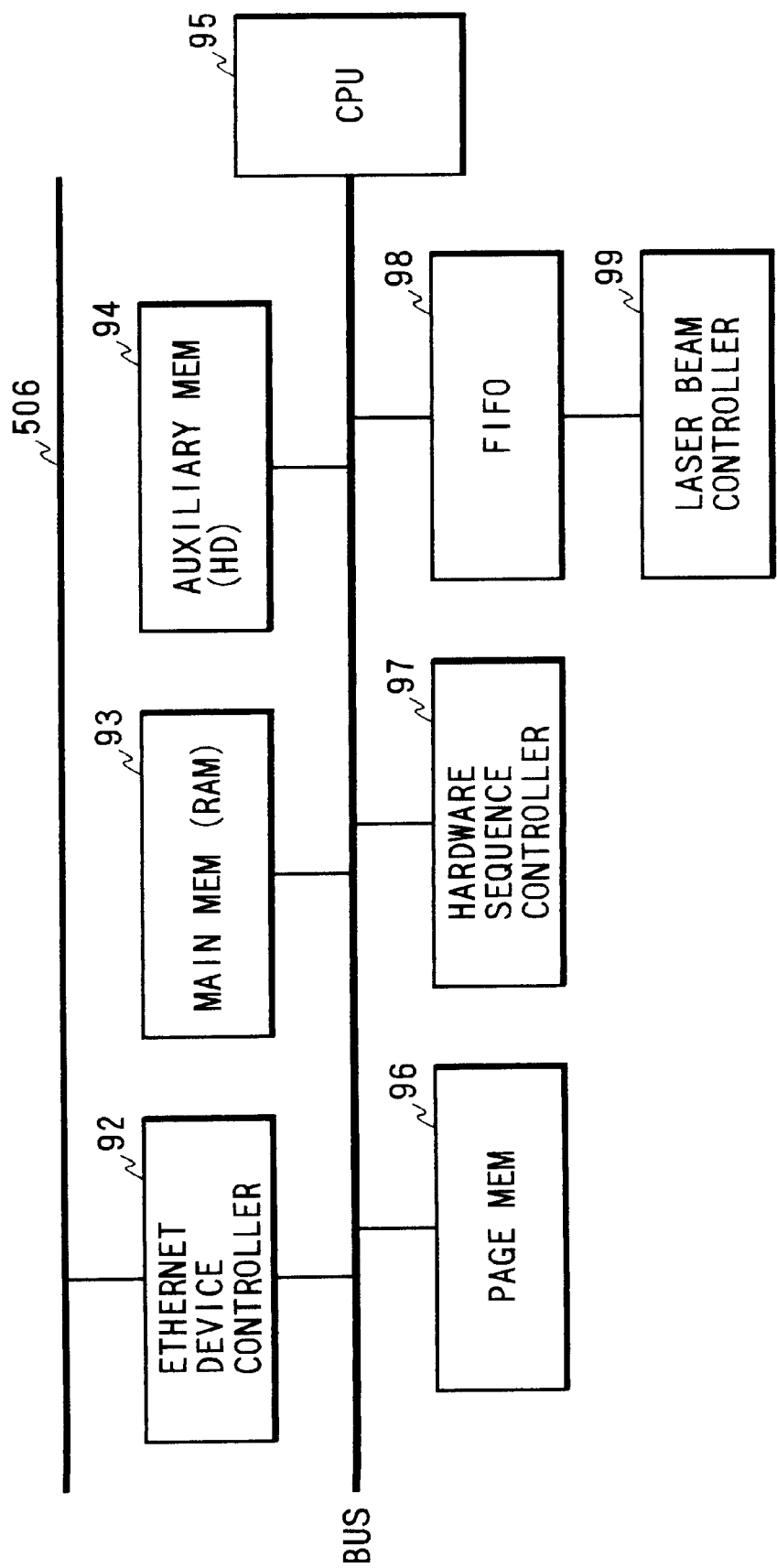
FIG. 6 is a hardware block diagram of a laser imager according to a third embodiment of the invention.

FIG. 6 is a hardware block diagram of the laser imager 102 of this embodiment.

The system structures of the laser imager 102 include an Ethernet device controller 92, a main memory 93, an auxiliary memory 94, a CPU 95, a page memory 96, a hardware sequence controller 97, a FIFO 98, and a laser beam controller 99.

Figure 7:
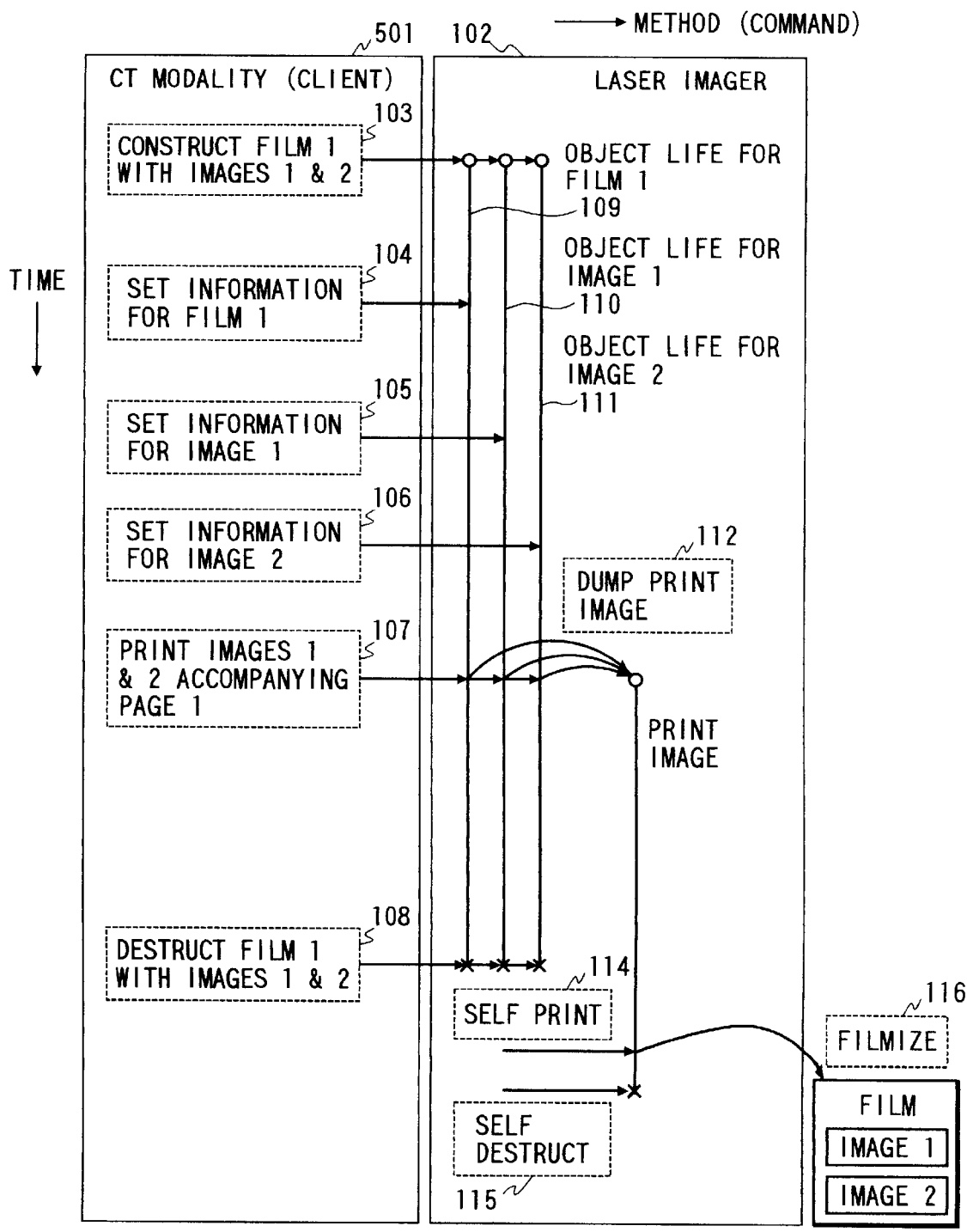
FIG. 7 is a diagram illustrating an operation of objects generated in response to methods issued from a client, according to the third embodiment.

FIG. 7 is a diagram illustrating the operations of objects generated by methods from the CT modality (client) 501, time sequentially from the upper to lower side.

With DICOM protocol, the CT modality 501 requests the laser imager 102 to construct an object 109 of a film 1 and a plurality of image objects (in this embodiment, image objects 110 and 111) to be printed on the film 1 (indicated at 103). The CT modality 501 receives an object ID of the constructed object of the film 1 and objects IDs of the two images 1 and 2.

The CT modality 501 sets film information for the film 1 by transferring it together with the film 1 object ID to the laser imager 102 (indicated at 104). The laser imager 102 stores these data in the main memory 93.

Next, the CT modality 501 sets image information for the image 1 by transferring it together with the image 1 object ID to the laser imager 102 (indicated at 105). Similarly, image information for the image 2 together with its object ID is set (indicated at 106). Pixel data in the set information is stored in the auxiliary memory 94.

Then, the CT modality 501 issues a print method for a film with two images (indicated at 107). In this embodiment, when the laser imager 102 receives this print method, the object of the film 1 and the objects of the images 1 and 2 are read from the main memory 93 and auxiliary memory 94, and developed on the page memory 96 to generate print images.

The page memory contents of the generated print images are dumped and stored again in the auxiliary memory 94, and pointers to the stored images are loaded in the print queue 4. Since the print images are stored in the above manner, there is no problem even if the print operation is executed at a later time.

Figure 8:
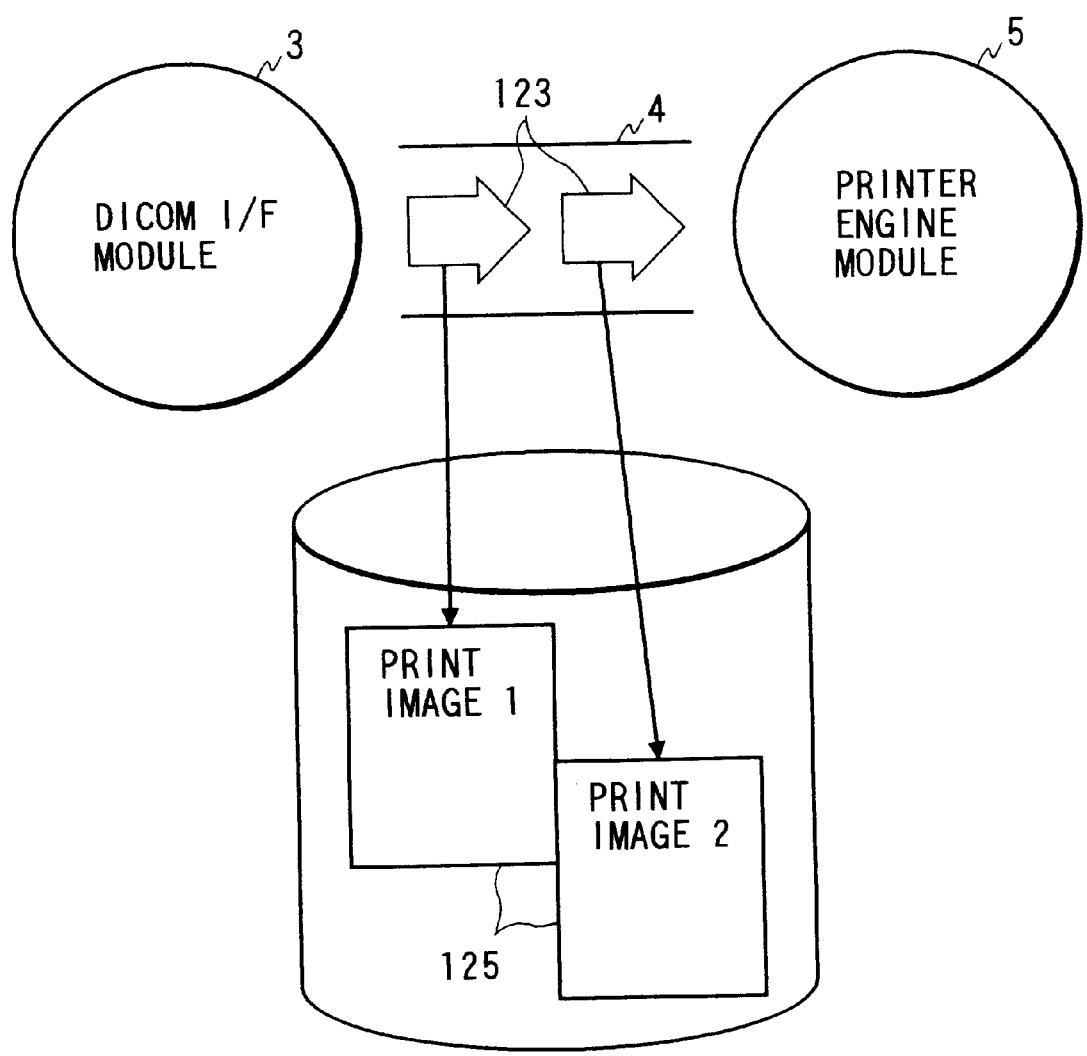
FIG. 8 is a diagram illustrating an object queuing state of the third embodiment.

FIG. 8 is a diagram showing the state of queuing of an object according to this embodiment. In the print queue 4, pointers 123 point the storage locations 125 of the print images in the auxiliary memory 94.

Returning back to FIG. 7, after issuing the print method, the CT modality 501 requests the laser imager to delete the object of the film 1 by sending the object ID of the film 1 (indicated at 108). In this embodiment, upon reception of the deletion method for the film 1 object, the laser imager 102 deletes the object 109 of the film 1 as well as the objects 110 and 111 of the two images 1 and 2 of the film 1.

In this deletion process, the print images have already been stored in the auxiliary memory 94 in response to the print method 107. According to the feature of this embodiment, therefore, an actual print work can be delayed without being affected by a film/image deletion method from the CT modality 501.

The printer engine module 5 fetches the pointers to the queued print images, and transfers the print images to FIFO 98. The laser beam controller 99 prints the images on a film by using hardware. Since the CT modality 501 considers that the laser imager 102 has already printed, it sequentially issues the deletion methods for the objects of the film 1 and images 1 and 2.

After the print is correctly filmized (indicated at 116), the printer engine module 5 of the laser imager 102 executes a self destruction for deleting objects used for printing (indication at 115) to release a storage area reserved in the laser imager 102.

Next, the fourth embodiment of the invention will be described.

An image drawing apparatus (an output representation form setting apparatus) of this embodiment is realized by a laser printer 132 in place of the laser printer 33 shown in FIG. 4. The laser printer 132 of this embodiment is interconnected to OA apparatuses such as a work station 31 and a personal computer 32 via 100M high speed Ethernet 34 running under object-oriented print protocol (OOPP).

The laser printer 132 of this embodiment has the same blocks as, and similar functions to, those of the laser printer 33 of the second embodiment shown in FIG. 3. In the following description, identical reference numerals to those shown in FIG. 3 are used for simplicity.

FIGS. 9A and 9B are diagrams illustrating the operations of objects generated by construct methods from the personal computer (client) 32, time sequentially from the upper to lower side.

The generation and deletion processes for an object are different from the third embodiment. In this embodiment, a page object and an image object are constructed asynchronously (133, 135, 136, 149). Deletion by a destruct method is also executed asynchronously relative to a page (143, 145, 146). Furthermore, image information is set again (142). In the above manner, objects are processed at a higher degree of freedom.

The operation method similar to the third embodiment can be used also in this embodiment. Specifically, when a print method 139 for the images 1 and 2 of an A4 size page 1 is received, the objects for this print method are read from the main and auxiliary memories 93 and 94 and developed in the page memory 96.

The page memory contents of the generated print images are dumped and stored again in the auxiliary memory 94, and pointers to the loaded print images are stored in the print queue 44. These operations are the same as the third embodiment.

Information of the image 2 is set twice (142). In this case, the contents of the image 2 object stored in the main and auxiliary memories 93 and 94 are updated. The second print method 144 is issued for the images 2 and 3 of the page 1. The operation for this second print method is similar to that for the first print method except that the image 2 different from the image 2 at the first print method is printed because the information of the image 2 was set again. After the pages are correctly printed (indicated at 156, 159), the printer engine module 45 of the laser printer 132 executes a self destruction for deleting objects used for printing to release a storage area reserved in the laser printer 132. The object 151 of the image 3 is not deleted but used for the next print.

In the third and fourth embodiments, when a print method is received at the image drawing apparatus, the print images are once developed on the page memory and stored in the auxiliary memory, and the pointers to the images are supplied to the print queue. Accordingly, a print time required is only a time for developing images in the page memory and a time for storing the images in the auxiliary memory, so that an efficient print operation can be performed.

Next, the fifth embodiment of the invention will be described.

An image drawing apparatus (an output representation form setting apparatus) of this embodiment is realized by a laser imager 172 corresponding to the laser imager 504 of the system shown in FIG. 19. The laser imager 172 of this embodiment is interconnected to medical CT 501, NMR 502, and DSA 503 via 10M Ethernet 506 running under DICOM protocol on TCP/IP protocol.

The laser imager 172 of this embodiment has the same blocks as, and similar functions to, those of the laser imager 2 of the first embodiment shown in FIG. 1. The hardware structures of the laser imager 172 of this embodiment are the same as those shown in FIG. 6. In the following description, identical reference numerals to those shown in FIGS. 1 and 6 are used for simplicity.

Figure 10:
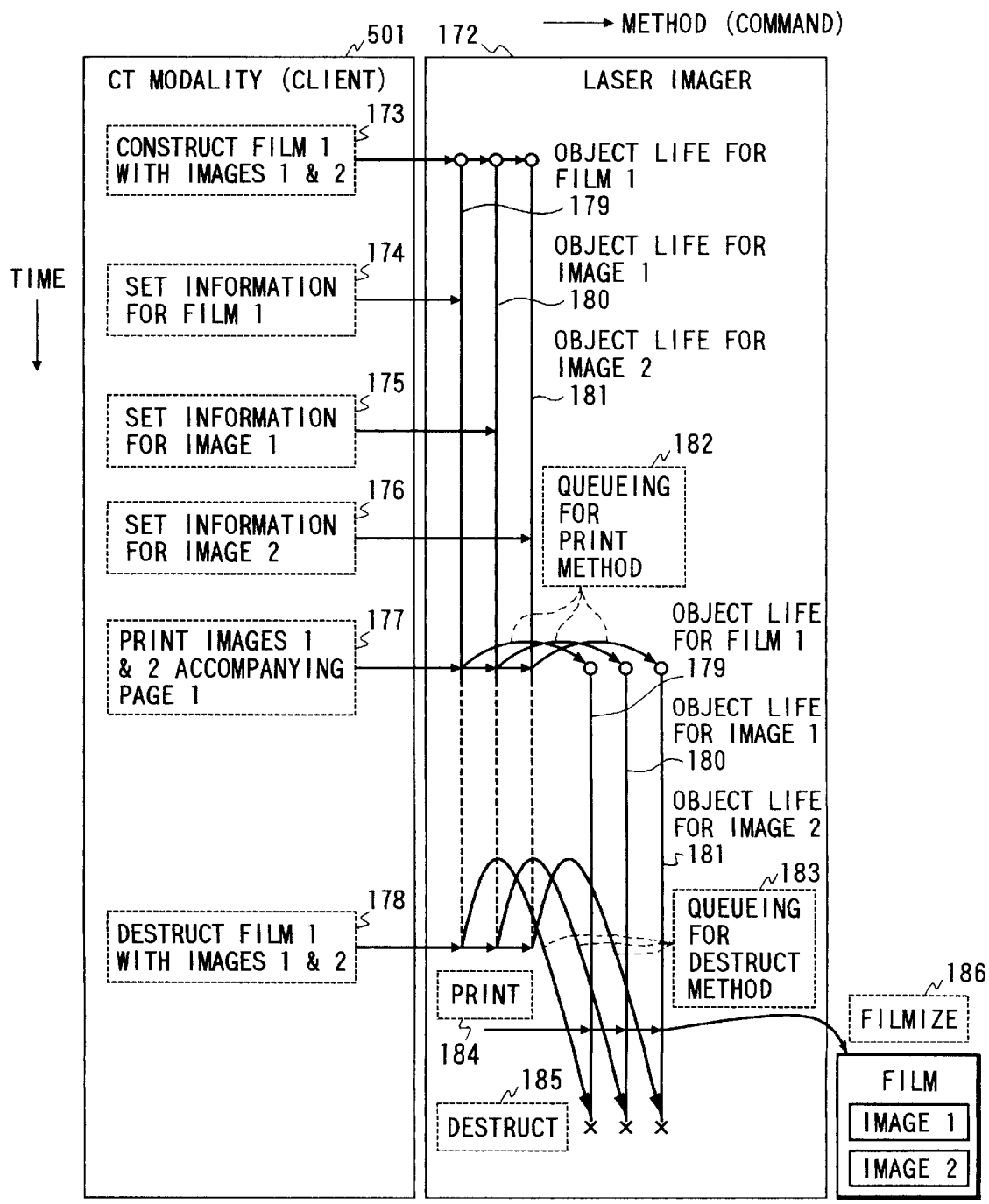
FIG. 10 is a diagram illustrating the operation of objects generated in response to methods issued from a client, according to a fifth embodiment of the invention.

FIG. 10 is a diagram illustrating the operations of objects generated by methods from the CT modality (client) 501, time sequentially from the upper to lower side.

With DICOM protocol, the CT modality 501 requests the laser imager 172 to construct an object 179 of a film 1 and a plurality of image objects (in this embodiment, image objects 180 and 181) to be printed on the film 1 (indicated at 173). The CT modality 501 receives an object ID of the constructed object of the film 1 and objects IDs of the two images 1 and 2.

The CT modality 501 sets film information for the film 1 by transferring it together with the film 1 object ID to the laser imager 172 (indicated at 174). The laser imager 172 stores these data in the main memory 93.

Next, the CT modality 501 sets image information for the image 1 by transferring it together with the image 1 object ID to the laser imager 172 (indicated at 175). Similarly, the image information for the image 2 together with its object ID is set (indicated at 176).

Next, the CT modality 501 issues a print method for the film with two images (indicated at 177).

Figure 11:
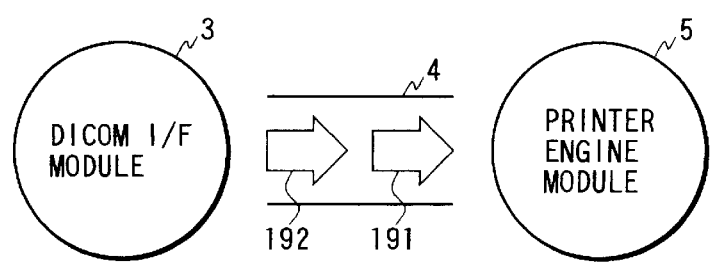
FIG. 11 is a diagram illustrating an object queuing state of the fifth embodiment.

FIG. 11 is a diagram showing the state of queuing of a method according to this embodiment.

In this embodiment, when the laser imager 172 receives a print method, the object of the film 1 and the objects of the images 1 and 2 of the film 1 are loaded in the print queue 4 (indicated at 182, 191).

After issuing the print method, the CT modality 501 requests the laser imager 172 to delete the object of the film 1 by sending the object ID of the film 1 (indicated at 178). In this embodiment, upon reception of the deletion method for the film 1 object, the laser imager 172 loads the object of the film 1 as well as the objects of the two images 1 and 2 of the film 1 into the print queue 4 (indicated at 183, 192), and notifies the CT modality of the effect that the objects have been deleted.

Since the objects are not deleted actually, the actual print operation can be executed at a later time without being adversely influenced by the destruct method. The print engine module 5 fetches the queued objects to print the images on a film by using hardware (indicated at 184).

After the print is correctly filmized (indicated at 181), the printer engine module 5 of the laser imager 172 picks up the next queue from the print queue 4. This picked-up queue corresponds to the destruct method. In this embodiment, therefore, the destruction operation is thereafter performed for the object of the film 1 and the objects of the images 1 and 2 of the film 1 (indicated at 185). In this manner, the storage area reserved in the laser imager 172 can be released.

Next, the sixth embodiment of the invention will be described.

An image drawing apparatus (an output representation form setting apparatus) of this embodiment is realized by a laser printer 202 in place of the laser printer 33 shown in FIG. 4. The laser printer 202 of this embodiment is interconnected to OA apparatuses such as a work station 31 and a personal computer 32 via 100M high speed Ethernet 34 running under object-oriented print protocol (OOPP).

The laser printer 202 of this embodiment has the same blocks as, and similar functions to, those of the laser printer 33 of the second embodiment shown in FIG. 3. In the following description, identical reference numerals to those shown in FIG. 3 are used for simplicity.

FIGS. 12A and 12B are diagrams illustrating the operations of objects generated by construct methods from the personal computer (client) 32, time sequentially from the upper to lower side.

The generation and deletion processes for an object are different from the fifth embodiment. In this embodiment, a page object and an image object are constructed asynchronously (203, 205, 206, 210). Deletion by a destruct method is also executed asynchronously relative to a page (213, 215, 216). Furthermore, image information is set again (212). In the above manner, objects are processed at a higher degree of freedom.

The operation method similar to the fifth embodiment can be used also in this embodiment. Specifically, when a print method 209 for the images 1 and 2 of an A4 size page 1 is received, this print method is queued. This is similar to the fifth embodiment.

Figure 13:
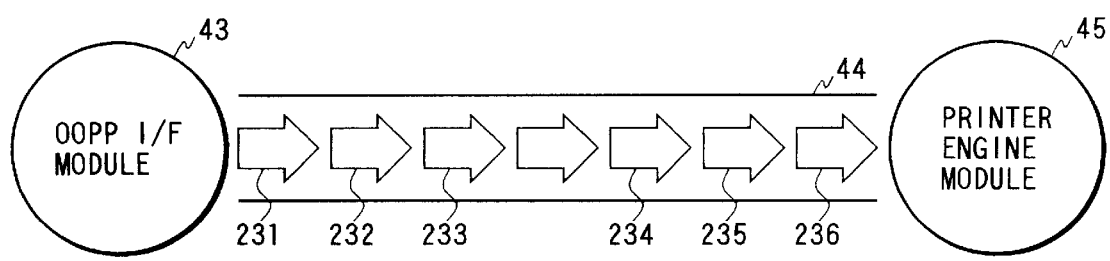
FIG. 13 is a diagram illustrating an object queuing state of the sixth embodiment.

FIG. 13 is a diagram illustrating a method queuing operation of this embodiment. The first queue 236 in this print queue corresponds to the print method 209. In FIG. 13, a queue 231 corresponds to the destruct method for an A4 page 1, a queue 232 corresponds to the destruct method for an image 2', a queue 233 corresponds to the print method for the A4 page 1 +images 2' and 3, a queue 234 corresponds to the destruct method for an image 1, a queue 235 corresponds to the destruct method for an image 2, and the queue 236 corresponds to the print method for the A4 page 1 +images 1 and 2.

Information of the image 2 is set twice (212). In this embodiment, when the information set method is received, the interface module 43 of the laser printer 202 deletes once the information of the image 2. From this reason, a destruct method is issued internally at the laser printer. Specifically, the destruct method for the image 2 is loaded in the print queue 44. There is no problem because when the information deletion is executed at the printer engine module 45, the print operation using the image 2 has been executed already and the object of the image 2 is not required to use.

The second information set method for the image 2 generates a new image object 2' (indicated at 212).

Next, the personal computer 32 issues a destruct method for the image 1. This method is also loaded in the print queue 44. The second print method 214 is for the images 2 and 3 of the page 1. The operation for this second print method is similar to that for the first print method except that the image 2 different from the image 2 at the first print method is printed because the information of the image 2 was set again.

Lastly, the personal computer 32 issues the destruct method 215 for the image 2, and then issues the destruct method 216 for the page 1. These destruct methods are also loaded in the print queue 44. After the page is correctly printed (indicated at 226), the printer engine module 45 of the laser printer 202 reads the print queue 44 to sequentially destruct the images 2 and 1. In this manner, the storage area reserved in the laser printer 202 is released. Thereafter, the print queue 44 is read and after the next page is correctly printed in response to the print method 228, the print queue 44 is again read to sequentially destruct the pages 2 and 1. In this manner, the storage area reserved in the laser printer 202 is released.

A priority order of the print operation may be set. In the above queuing operation, all the methods are loaded in the print queue 44 at the lowest and same priority. If the second print method is made to have a higher priority, this print method is queued at the queue start position. Since the destruct methods are queued always at the lowest priority order in the print queue 44, there is no problem in this respect.

In the fifth and sixth embodiments, since print methods and resources destruct methods are loaded in the print queue of the image drawing apparatus, an efficient print operation becomes possible without giving a wait time to the client.

Next, the seventh embodiment of the invention will be described.

An image drawing apparatus (an output representation form setting apparatus) of this embodiment is realized by a laser imager 242 corresponding to the laser imager 504 of the system shown in FIG. 19. The laser imager 242 of this embodiment is interconnected to medical CT 501, NMR 502, and DSA 503 via 10M Ethernet 506 running under DICOM protocol on TCP/IP protocol.

The laser imager 242 of this embodiment has the same blocks as, and similar functions to, those of the laser imager 2 of the first embodiment shown in FIG. 1. The hardware structures of the laser imager 242 of this embodiment are the same as those shown in FIG. 6. In the following description, identical reference numerals to those shown in FIGS. 1 and 6 are used for simplicity.

Figure 14:
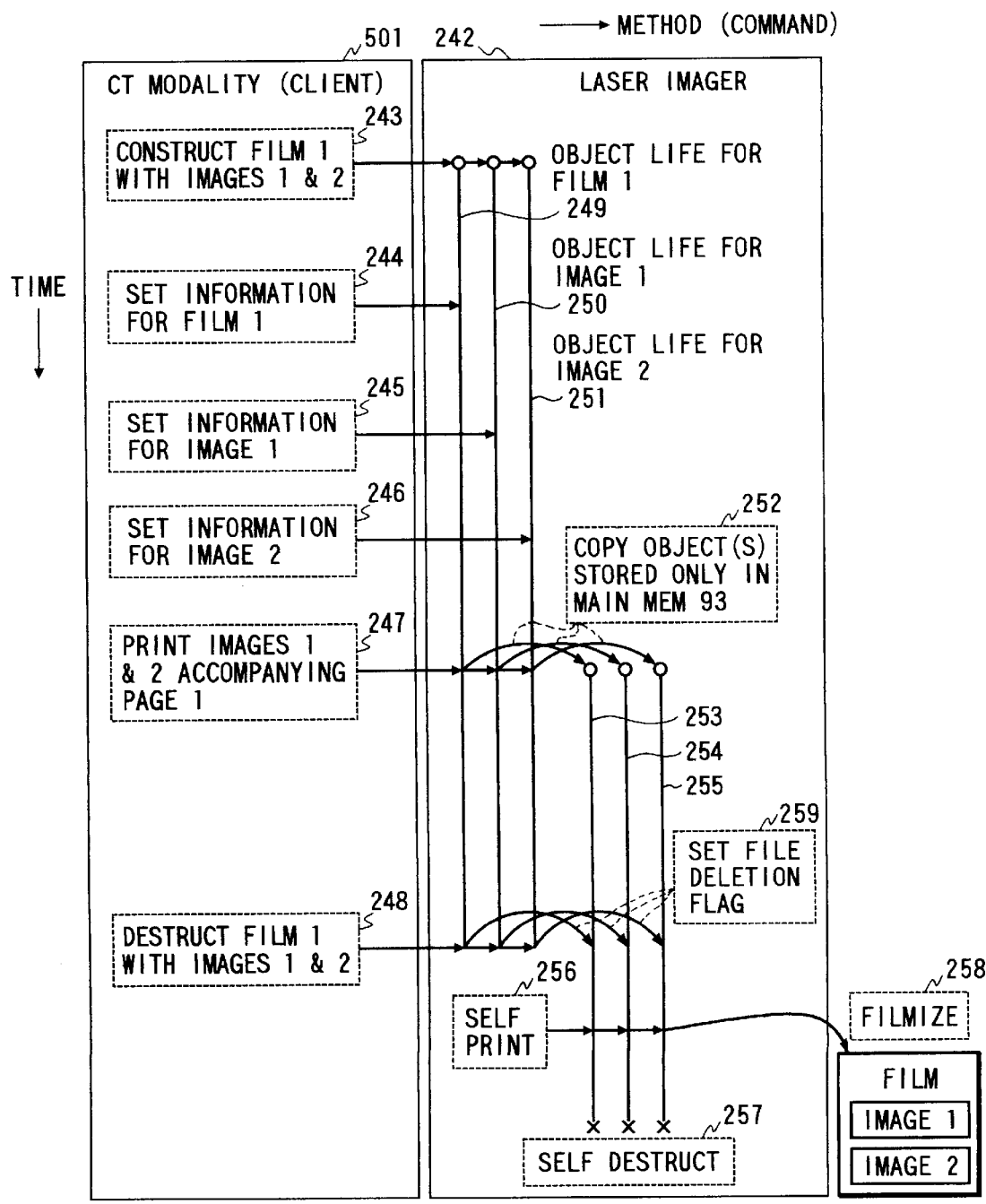
FIG. 14 is a diagram illustrating the operation of objects generated in response to methods issued from a client, according to a seventh embodiment of the invention.

FIG. 14 is a diagram illustrating the operations of objects generated by methods from the CT modality (client) 501, time sequentially from the upper to lower side.

With DICOM protocol, the CT modality 501 requests the laser imager 242 to construct an object 249 of a film 1 and a plurality of image objects (in this embodiment, image objects 250 and 251) to be printed on the film 1 (indicated at 243). The CT modality 501 receives an object ID of the constructed object of the film 1 and objects IDs of the two images 1 and 2.

The CT modality 501 sets film information for the film 1 by transferring it together with the film 1 object ID to the laser imager 242 (indicated at 245).

Figure 15:
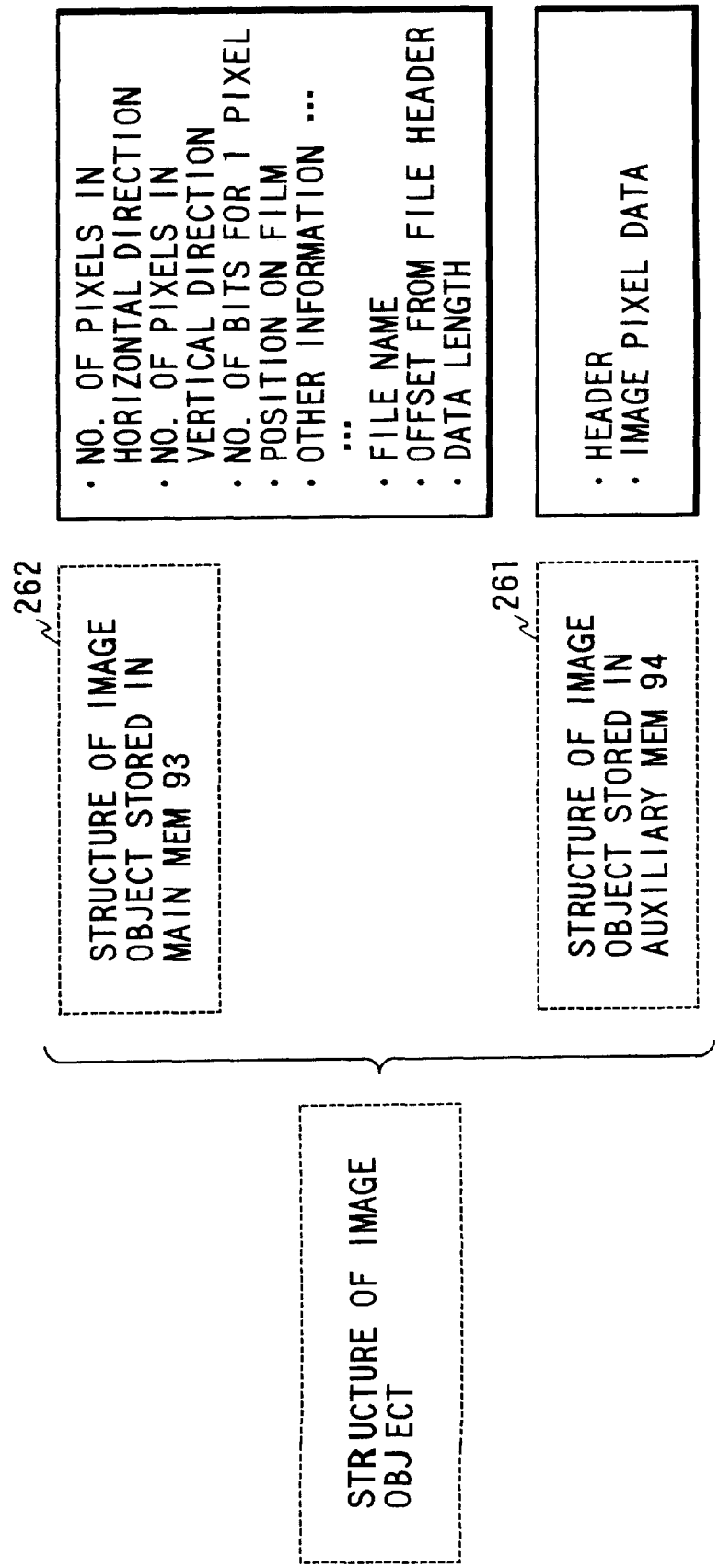
FIG. 15 is a diagram showing an image object structure (scheme) of the seventh embodiment.

FIG. 15 shows the image object structure (schema) of this embodiment. A method of storing set information will be described with reference to FIG. 15.

Image information itself transferred from the CT modality 501 is stored in a hard disk of the auxiliary memory 94 of the laser imager 242, in the form of an image file. The laser imager 242 stores particular information of the transferred information in the main memory 93 (indicated at 262), the particular information being image information having a relatively small data amount and including, for example, the number of pixels of the image data in the horizontal and vertical directions, the number of bits per pixel, the position of an image on a film, and the like. Since image pixel data has a large data amount, it is not stored in the main memory 93. This image pixel data is stored in the auxiliary memory 94 having the image object structure 261.

To this end, stored in the main memory 93 having image object structure 262 are its file name, a file name in the hard disk, an offset from the top of the file starting from which image pixel data is stored, and an image pixel data length.

Returning back to FIG. 14, similarly, the image information for the image 2 together with its object ID is set (indicated at 246). Next, the CT modality 501 issues a print method for the film with two images (indicated at 247).

According to the feature of this embodiment, when the laser imager 242 receives this print method, it copies the object of the film 1 and the objects of the images 1 and 2 of the film 1 respectively stored in the main storage 93, and it does not copy the image objects in the auxiliary memory 94 (indicated at 252). In this manner, it becomes possible to considerably shorten a copy time of the laser imager 242 and to reduce the use of memory resources of the laser imager 242.

Figure 16:
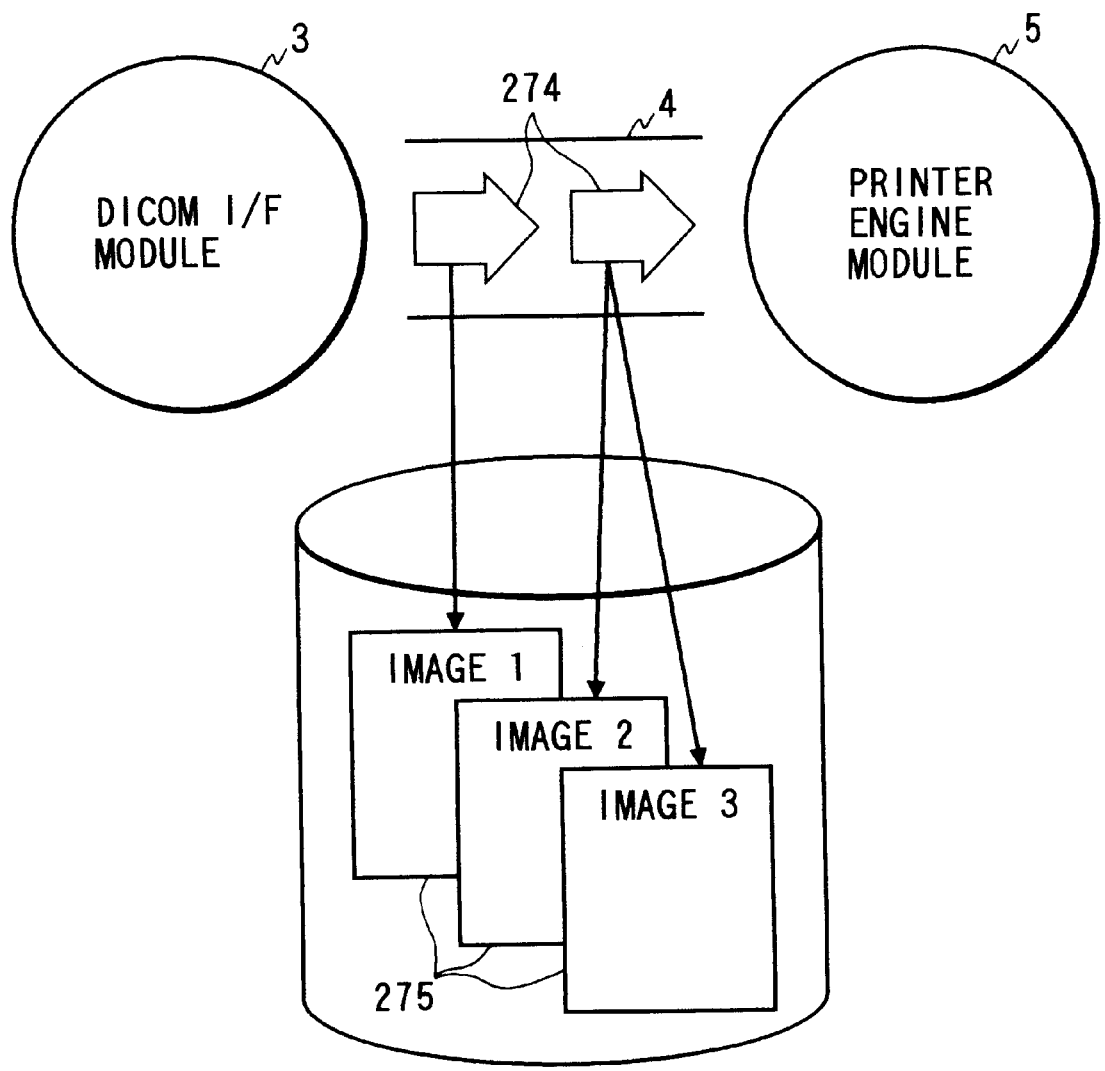
FIG. 16 is a diagram illustrating an object queuing state of the seventh embodiment.
Figure 20B:
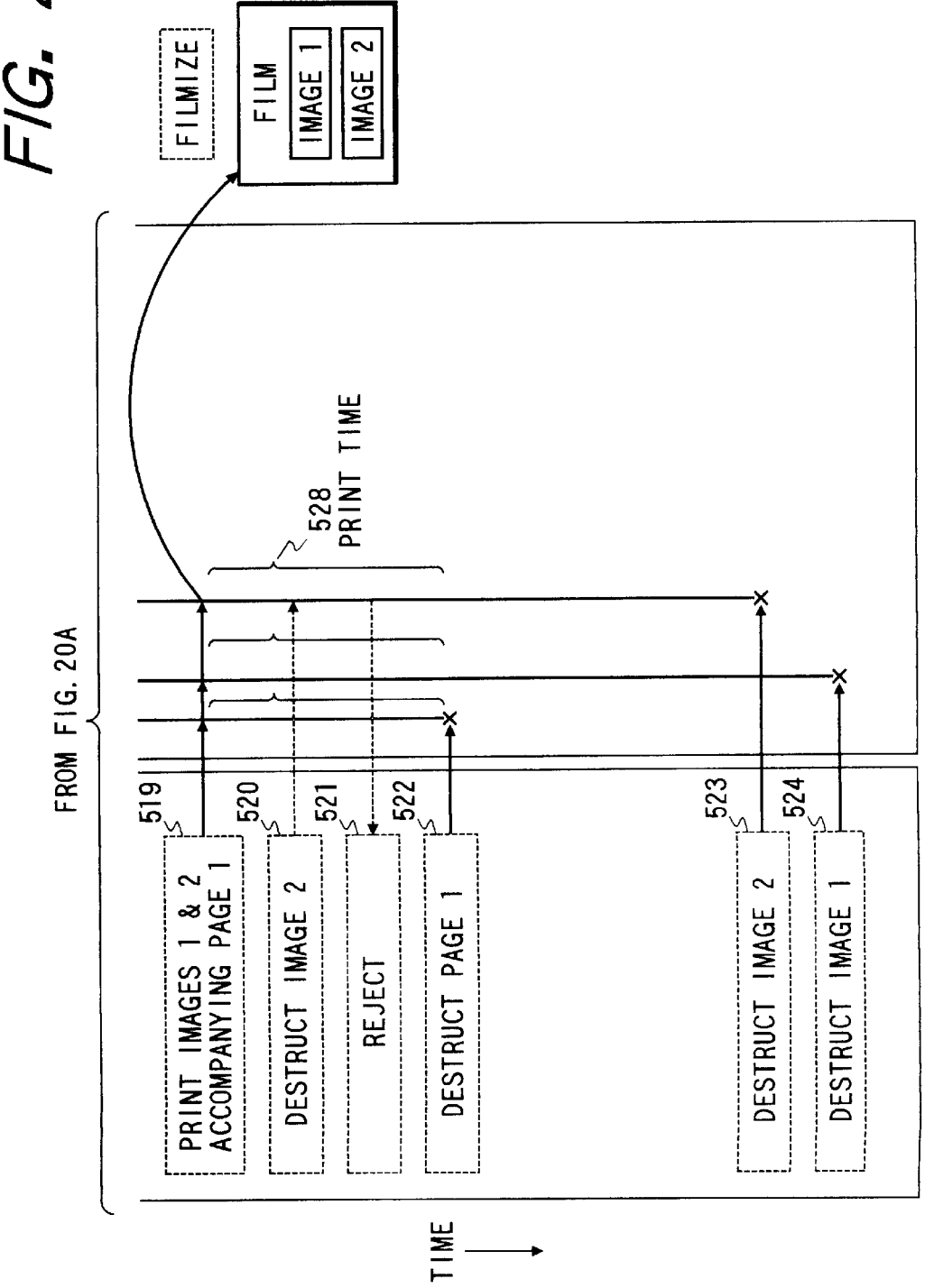
FIG. 20 is comprised of FIGS. 20A and 20B showing diagrams illustrating the operation of objects in a laser imager according to a prior art.

FIG. 16 is a diagram showing the state of queuing of an object according to this embodiment.

The DICOM interface module 3 of the laser imager 242 queues the objects copied from the main memory 93 into the print queue 4 of a file unit structure. The contents of the print queue 4 are the objects 274 copied from the main memory 93 and the objects 275 in the auxiliary memory 94 not copied.

Returning back to FIG. 14, after issuing the print method, the CT modality 501 requests the laser imager 242 to delete the object of the film 1 by sending the object ID of the film 1 (indicated at 248). In this embodiment, upon reception of the deletion method for the film 1 object, the laser imager 242 deletes the object 249 of the film 1 and the image objects 250 and 251 of the two images 1 and 2 respectively stored in the main memory 93, and does not delete the image objects stored in the auxiliary memory 94 in the form of a file.

FIG. 17 is a flow chart illustrating an object deleting process of this embodiment.

In this embodiment, in deleting an image object, an image object copied is searched, starting from the last queue, i.e., last printed queue, in the print queue 4 (at Step S1). If the image object is searched, an "auxiliary memory object deletion flag" is set to the searched object, the flag indicating to delete the corresponding image object (in this embodiment, a file) in the auxiliary memory 94 (at Step S2, indicated at 259). This flag is used when the image object in the print queue is deleted.

If there is no object copied in the print queue 4, the image object in the secondary memory 94 corresponding to the destruct method is deleted (at Step S3) and the object in the main memory 93 is deleted (at Step S4).

Returning back to FIG. 14, the queued objects 243, 244, and 245 are not deleted in this deletion operation because the objects were copied (indicated at 252) in response to the print method 247. Therefore, an actual print operation can be executed at a later time without being affected by the film/image destruct method from the CT modality 501.

The print engine module 5 fetches the queued objects to print the images on a film by using hardware (indicated at 256). The laser imager 242 itself performs a self print by issuing a print method to its own objects (indicated at 256).

Since the CT modality 501 considers that the laser imager 242 has already printed, it sequentially issues the deletion methods for the objects of the film 1 and images 1 and 2.

After the print is correctly filmized (indicated at 258), the printer engine module 5 of the laser imager 242 performs a self destruction operation to delete the objects used for printing (indicated at 257). In this embodiment, only an object in the auxiliary memory 94 having the auxiliary memory object deletion flag added thereto is deleted, and thereafter the corresponding object in the main memory 93 is deleted. In this manner, a storage area reserved in the laser imager 242 is released.

Next, the eighth embodiment of the invention will be described.

An image drawing apparatus (an output representation form setting apparatus) of this embodiment is realized by a laser printer 282 in place of the laser printer 33 shown in FIG. 4. The laser printer 282 of this embodiment is interconnected to OA apparatuses such as a work station 31 and a personal computer 32 via 100M high speed Ethernet 34 running under object-oriented print protocol (OOPP).

The laser printer 282 of this embodiment has the same blocks as, and similar functions to, those of the laser printer 33 of the second embodiment shown in FIG. 3. In the following description, identical reference numerals to those shown in FIG. 3 are used for simplicity.

FIGS. 18A and 18B are diagrams illustrating the operations of objects generated by construct methods from the personal computer (client) 32, time sequentially from the upper to lower side.

The generation and deletion processes for an object are different from the seventh embodiment. In this embodiment, a page object and an image object are constructed asynchronously (283, 285, 286, 290). Deletion by a destruct method is also executed asynchronously relative to a page (293, 295, 296). Furthermore, image information is set again (292). In the above manner, objects are processed at a higher degree of freedom.

The operation method similar to the seventh embodiment can be used also in this embodiment. Specifically, when a print method 289 for the images 1 and 2 of an A4 size page 1 is received, the objects for this print method stored only in the main memory 93 are copied. In this case, all the page and image information transferred from the personal computer 32 is not necessary to be copied. It is sufficient if only the information necessary for printing is copied.

In this embodiment, therefore, not all objects are copied but only the information necessary for printing is copied. Specifically, a simple copy of objects stored only in the main memory 93 is performed. In this manner, a more efficient print operation is possible without using an unnecessary storage area of the laser printer. Corresponding objects in the auxiliary memory 94 are not copied. This is similar to the seventh embodiment.

Information of the image 2 is set twice (indicated at 292). In this embodiment, when the information setting method is received at the interface module 43 of the laser printer 282 and when an image object is to be deleted, the interface module 43 searches an image object copied, starting from the last queue, i.e., last printed queue, in the print queue 4. If the image object is searched, the "auxiliary memory object deletion flag" is set to the searched object, the flag indicating to delete the corresponding image object (in this embodiment, a file) in the auxiliary memory 94.

This flag is used when the image object in the print queue is deleted. If there is no object copied in the print queue 4, the image object in the secondary memory 94 corresponding to the destruct method is deleted (at Step S3). After the search, image data transferred in response to this information setting method and other data are newly generated, and the contents of the image objects in the main memory 93 are updated.

The second print method 294 is for the images 2 and 3 of the page 1. The operation for this second print method is similar to that for the first print method except that the image 2 different from the image 2 at the first print method is printed because the information of the image 2 was set again.

Also in this embodiment, the "auxiliary memory object deletion flag" is added in order to deal with the destruct method, similar to the seventh embodiment. Specifically, after the pages are printed correctly (indicated at 307, 310), the printer engine module 45 of the laser printer 282 performs a self destruction operation to delete the objects used for printing (indicated at 308, 309). In this embodiment, only an object in the auxiliary memory 94 having the auxiliary memory object deletion flag added thereto is deleted, and thereafter the corresponding object in the main memory 93 is deleted. In this manner, a storage area reserved in the laser printer 282 is released. The object of the image 3 is not deleted but it is used for the next printing (indicated at 301).

In the seventh and eighth embodiments, all or necessary minimum objects are copied in the image drawing apparatus, and data having a large amount such as image pixel data of the object is not copied. The copied objects are supplied to the print queue so that an efficient print operation is possible.

In the seventh embodiment, the film object may be added with image information such as an image always added to the upper left of the film. In this case, the film object is divided into the main memory 93 and auxiliary memory 94 so that an efficient print operation becomes possible in the similar manner described above. Since the look-up table object, image overlay object, and the like have a large amount of data, these objects are also divided into the main memory 93 and auxiliary memory 94 so that an efficient print operation becomes possible in the similar manner described above.

In each of the above embodiment, an output representation form setting apparatus may be a CRT.

As described above in detail, according to the embodiments, with a copy operation or simple copy operation of objects, an efficient print operation becomes possible without obstructing an issuance of a method by a client. Even if a client issues an object destruct or change method, an image at the time when the print method is issued can be drawn correctly. With a simple copy of objects, the storage area of the apparatus is not used unnecessarily so that an efficient print operation becomes possible.

Further, according to the embodiments, since the print images are generated when a print method is received and they are stored in the second storage means or at the second storing step, an efficient print operation becomes possible without obstructing an issuance of a method by a client. Even if a client issues an object destruct or change method, an image at the time when the print method is issued can be drawn correctly.

Still further, according to the embodiments, since the methods are queued, an efficient print operation becomes possible without obstructing an issuance of a method by a client. Even if a client issues an object destruct or change method, an image at the time when the print method is issued can be drawn correctly.

Furthermore, according to the embodiments, since a copy operation or simple copy operation of objects in the main memory is executed without copying objects in the auxiliary memory, an efficient print operation becomes possible without obstructing an issuance of a method by a client and without unnecessarily using the storage area of the apparatus. Even if a client issues an object destruct or change method, an image at the time when the print method is issued can be drawn correctly.

What is claimed is:

1. An image processing apparatus comprising:
    first means for controlling first memory means to store first image information received from a higher level apparatus;
    second means for controlling second memory means to store second image information corresponding to the first information stored in the first memory means in response to a print instruction from the higher level apparatus;
    third means for controlling the first memory means to delete the first image information and informing the higher level apparatus of successful deletion of the first image information in response to a delete instruction from the higher level apparatus; and
    fourth means for controlling the second memory means to delete the second image information after the second image information has been printed.

2. An image processing apparatus according to claim 1, wherein the second image information comprises information obtained by copying the first image information.

3. An image processing apparatus according to claim 1, wherein the second image information comprises information obtained by copying a part of the first image information.

4. An image processing apparatus according to claim 1, wherein the second image information comprises information obtained by dumping the first image information.

5. An image processing apparatus according to claim 1, further comprising fifth means for controlling third memory means to store third image information corresponding to the first information stored in the first memory means in response to a second print instruction from the higher level apparatus.

6. An image processing apparatus according to claim 1, further comprising print means for printing data based on the second image information stored in the second memory means.

7. An image processing apparatus according to claim 1, wherein the first and second image information each comprises image pixel data and position information indicating a position of an image on a film.

8. An image processing apparatus comprising:

memory means for storing at least one piece of image information received from a higher level apparatus;

first queuing means for queuing a print instruction received from the higher level apparatus;

second queuing means for, when a delete instruction is received from the higher level apparatus, queuing the delete instruction and sending information representing that one piece of image information, stored in said memory means and designated by the delete instruction, has been deleted to the higher level apparatus; and control means for picking up one instruction from said first and/or second queuing means each time another instruction has been executed, wherein said control means controls print means to print one piece of image information, stored in said memory means, designated by the one picked up instruction if this instruction is a print instruction and controls said memory means to delete one piece of image information designated by the one picked up instruction if this instruction is a delete instruction.

9. An image processing apparatus according to claim 8, wherein said memory means stores a plurality of pieces of image information.

10. An image processing apparatus according to claim 8, wherein said first queuing means can queue a plurality of print instructions and the plurality of print instructions can designate a same piece of information.

11. An image processing apparatus according to claim 8, wherein the delete instruction designates a plurality of pieces of image information together.

12. An image processing apparatus according to claim 8, wherein the delete instruction designates one piece of image information.

13. An image processing apparatus according to claim 8, further comprising print means for printing data based on the at least one piece of image information stored in said memory means.

14. An image processing method comprising:

first step of controlling first memory means to store first image information received from a higher level apparatus;

a second step of controlling second memory means to store second image information corresponding to the first information stored in the first memory means in response to a print instruction from the higher level apparatus;

a third step of controlling the first memory means to delete the first image information and informing the higher level apparatus of successful deletion of the first image information in response to a delete instruction from the higher level apparatus; and a fourth step of controlling the second memory means to delete the second image information after the second image information has been printed.

15. An image processing method according to claim 14, wherein the second image information comprises information obtained by copying the first image information.

16. An image processing method according to claim 14, wherein the second image information comprises information obtained by copying a part of the first image information.

17. An image processing method according to claim 14, wherein the second image information comprises information obtained by dumping the first image information.

18. An image processing method according to claim 14, said method further comprising a fifth step of controlling third memory means to store third image information corresponding to the first information stored in the first memory means in response to a second print instruction from the higher level apparatus.

19. An image processing method according to claim 14, further comprising a printing step of printing data based on the second image information stored in the second memory means.

20. An image processing method according to claim 14, wherein the first and second image information each comprises image phxel data and position information indicating a position of an image on a film.

21. An image processing method comprising:

a storing step of storing, in memory means, at least one piece of image information received from a higher level apparatus;

a first queuing step of queuing a print instruction received from the higher level apparatus;

a second queuing step of, when a delete instruction is received from the higher level apparatus, queuing the delete instruction and sending information representing that one piece of image information, stored in the memory means and designated by the delete instruction, has been deleted to the higher level apparatus; and a control step of picking up one instruction queued at said first and/or second queuing step each time another instruction has been executed, wherein said control step controls print means to print one piece of image information, stored in the memory means, designated by the one picked up instruction if this instruction is a print instruction and controls the memory means to delete one piece of image information designated by the one picked up instruction if this instruction is a delete instruction.

22. An image processing method according to claim 21, wherein the memory means stores a plurality of pieces of image information.

23. An image processing method according to claim 21, wherein said first queuing step can queue a plurality of print instructions and the plurality of print instructions can designate a same piece of information.

24. An image processing method according to claim 21, wherein the delete instruction designates a plurality of pieces of image information together.

25. An image processing method according to claim 21, wherein the delete instruction designates one piece of image information.

26. An image processing method according to claim 21, further comprising a printing step of printing data based on the at least one piece of image information stored in the memory means.

* * * * *